(12) United States Patent
Boyd

(10) Patent No.: US 9,501,066 B2
(45) Date of Patent: Nov. 22, 2016

(54) CONTROLS AND CONTROLLERS FOR AIR MATTRESS SYSTEMS

(71) Applicant: Dennis M. Boyd, St. Louis, MO (US)

(72) Inventor: Dennis M. Boyd, St. Louis, MO (US)

(*) Notice: Subject to any disclaimer, the term of this patent is extended or adjusted under 35 U.S.C. 154(b) by 270 days.

(21) Appl. No.: 14/252,635

(22) Filed: Apr. 14, 2014

(65) Prior Publication Data

US 2015/0082547 A1 Mar. 26, 2015

Related U.S. Application Data

(63) Continuation of application No. 14/037,070, filed on Sep. 25, 2013.

(51) Int. Cl.
| G08B 21/00 | (2006.01) |
| G05D 16/20 | (2006.01) |
| G05D 7/06 | (2006.01) |
| A47C 27/08 | (2006.01) |
| A47C 31/00 | (2006.01) |

(52) U.S. Cl.
CPC ......... *G05D 16/2006* (2013.01); *A47C 27/082* (2013.01); *A47C 27/083* (2013.01); *A47C 31/008* (2013.01); *G05D 7/0617* (2013.01)

(58) Field of Classification Search
CPC .. A47C 27/10; A47C 27/081; A47C 27/082; A47C 27/083; A47C 31/008; G05D 7/0617; G05D 16/2006
USPC ......................................................... 340/626
See application file for complete search history.

(56) References Cited

U.S. PATENT DOCUMENTS

| 6,392,962 B1 * | 5/2002 | Wyatt | G04F 8/08 368/107 |
| 7,937,239 B2 * | 5/2011 | Boyd | A47C 31/123 702/127 |
| 2014/0026326 A1 * | 1/2014 | Codos | A47C 27/083 5/713 |
| 2014/0259434 A1 * | 9/2014 | Nunn | A47C 27/083 5/713 |

* cited by examiner

*Primary Examiner* — Kerri McNally
(74) *Attorney, Agent, or Firm* — Harness, Dickey & Pierce, P.L.C.

(57) ABSTRACT

A display for displaying the condition of an air mattress. The display comprises a plurality of arrays of elements organized in a hierarchy. Each element represents a pressure increment. Each array comprises a plurality of rows and a plurality columns. The elements in each row of an array being distinctive in appearance from the elements in the other rows of the array. A control that operates the elements to indicate the pressure beginning with the first column, of the first row, of the lowest array in the hierarchy.

14 Claims, 30 Drawing Sheets

CONTROLS AND CONTROLLERS FOR AIR MATTRESS SYSTEMS

CROSS-REFERENCE TO RELATED APPLICATIONS

This application is a continuation of U.S. patent application Ser. No. 14/037,070, filed Sep. 25, 2013, the entire disclosure of the application is incorporated herein by reference.

FIELD

The present disclosure relates to air mattresses, and in particular to controls for, and controllers for, air mattress systems.

BACKGROUND

This section provides background information related to the present disclosure which is not necessarily prior art.

Air cushions, such as air mattresses, are increasingly popular because they are light weight and comfortable, and easy to adjust by adjusting the internal pressure. However, while the pressure is easy to control by adding and subtracting air, it is often difficult for users to understand how a particular level of pressure relates to the comfort or "feel" of the mattress.

SUMMARY

This section provides a general summary of the disclosure, and is not a comprehensive disclosure of its full scope or all of its features.

Embodiments of the present invention provide improved displays for controllers for operating an air mattress system, improved controller for operating an air matter system, and improve controls for air mattress systems.

A preferred embodiment of a display according to the principles of this invention comprises a plurality of arrays of elements organized in a hierarchy. Each of the elements represents a pressure increment. Each array comprises a plurality of rows of a plurality of elements, preferably arranged in columns. The elements in each array are preferably distinctive in appearance from the elements in the other arrays, and more preferably the elements in each row of an array are distinctive in appearance from the elements in the other rows of the array. A control operates the elements to indicate the pressure by activating the unactivated element in the lowest row of the lowest array, and deactivating the activated element in the highest row of the highest array.

The display preferably further comprises a pressure display that displays a numerical value corresponding to the value displayed by the elements. The elements of each array preferably have a unique color, and the numerical value is displayed in the same color as the highest array in the hierarchy which has an activated element.

The display preferably also includes a level display that displays an alphanumeric character corresponding to the highest array in the hierarchy which has an activated element, and this value is preferably displayed in the same color as the highest array in the hierarchy which has an activated element.

Each of the arrays of the display is preferably assigned a descriptive name, and the display preferably includes a name display showing displays the descriptive name corresponding to the highest array in the hierarchy which has an activated element, and this name is preferably displayed in the same color as the highest array in the hierarchy which has an activated element.

In the preferred embodiment there are four arrays, of twenty-five elements each. Each array is preferable arranged in five rows of five columns. The color of the elements in each successive row of an array is more intense than the previous row.

According to other embodiments, a controller is provided for controlling the pressure in an air cushion, such as an air mattress. The preferred embodiment of this controller preferably comprises a plurality of controls for operating a pressure system to change the pressure in the air mattress, and at least one display in accordance with this disclose.

The controller can be adapted for controlling the pressure in each of the chambers of a multi-chamber air mattress. The controller preferably comprises at least one control for operating a pressure system to change the pressure in each of the chambers of the multi-chamber air mattress, and a display in accordance with this disclosure for each of the chambers of the multi-chamber.

In an alternate embodiment, the controller can comprise a selector for selecting one of the chambers of the multi-chamber air mattress to control, controls for operating a pressure system to change the pressure the selected chamber of the multi-chamber air mattress, and a display in accordance with this disclosure.

According to still other embodiments, a control is provided for operating the air pump in an air mattress system to provide greater functionality and or ease of use.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 18A:
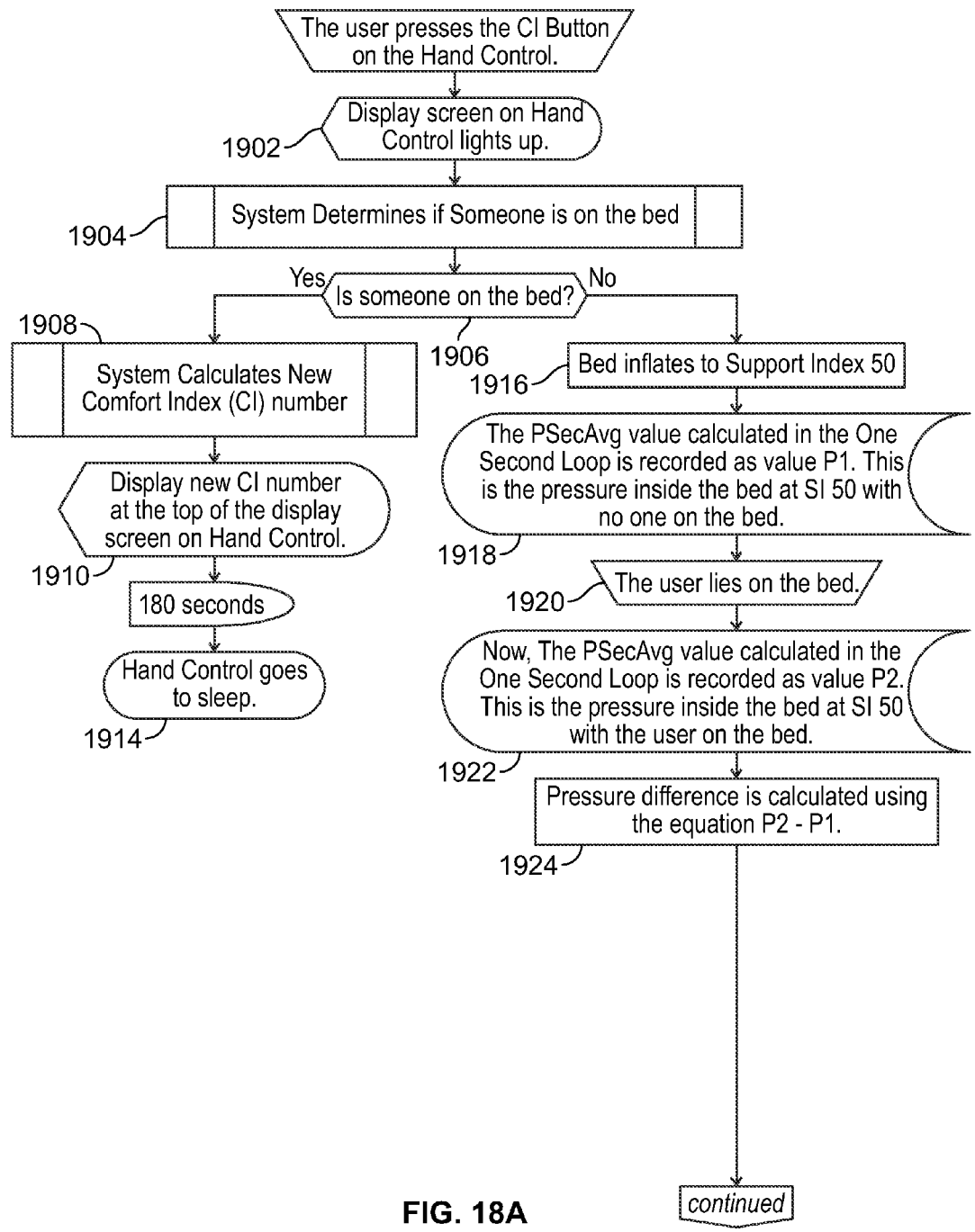
Figure 18B:
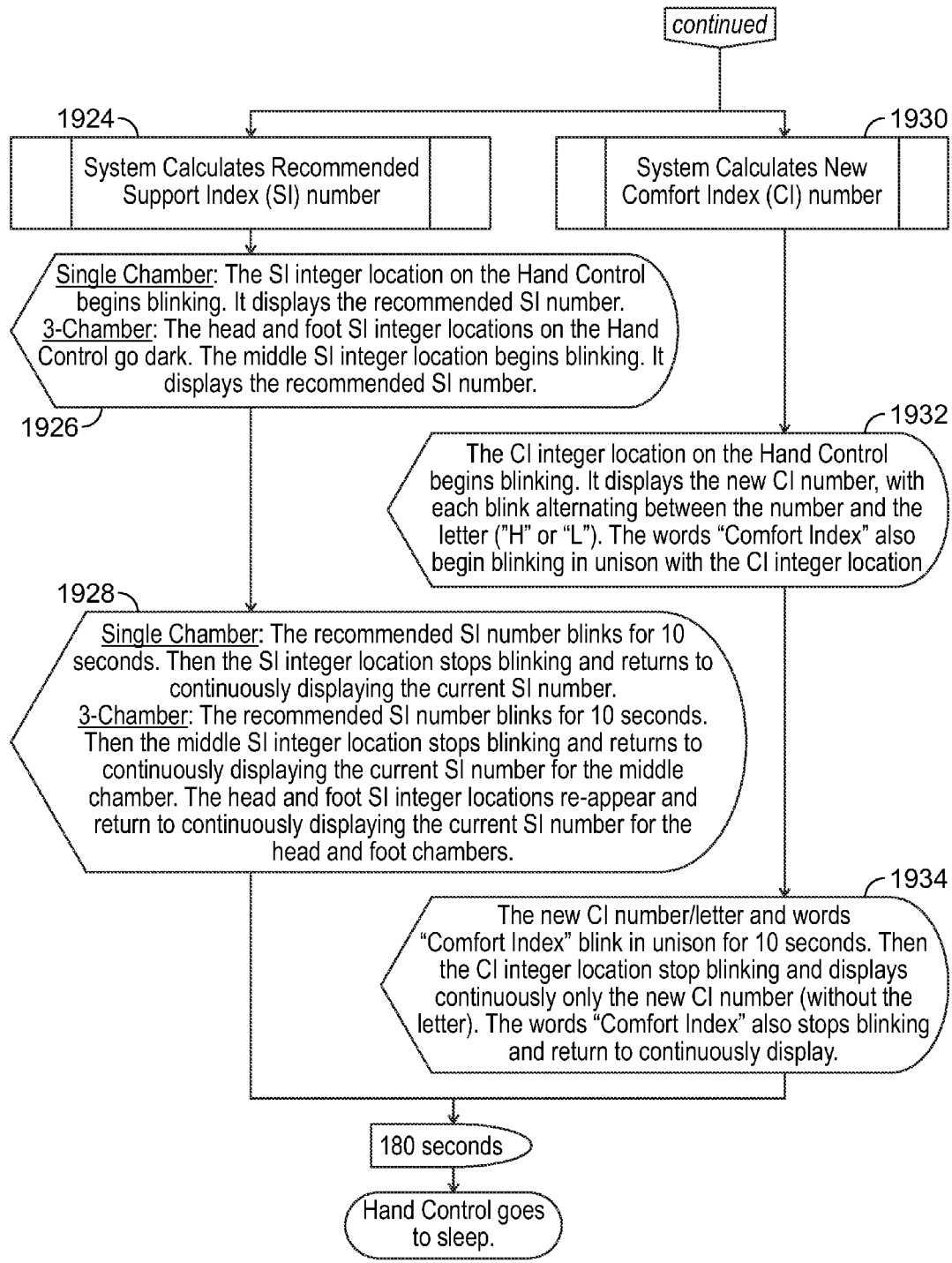
Figure 19A:
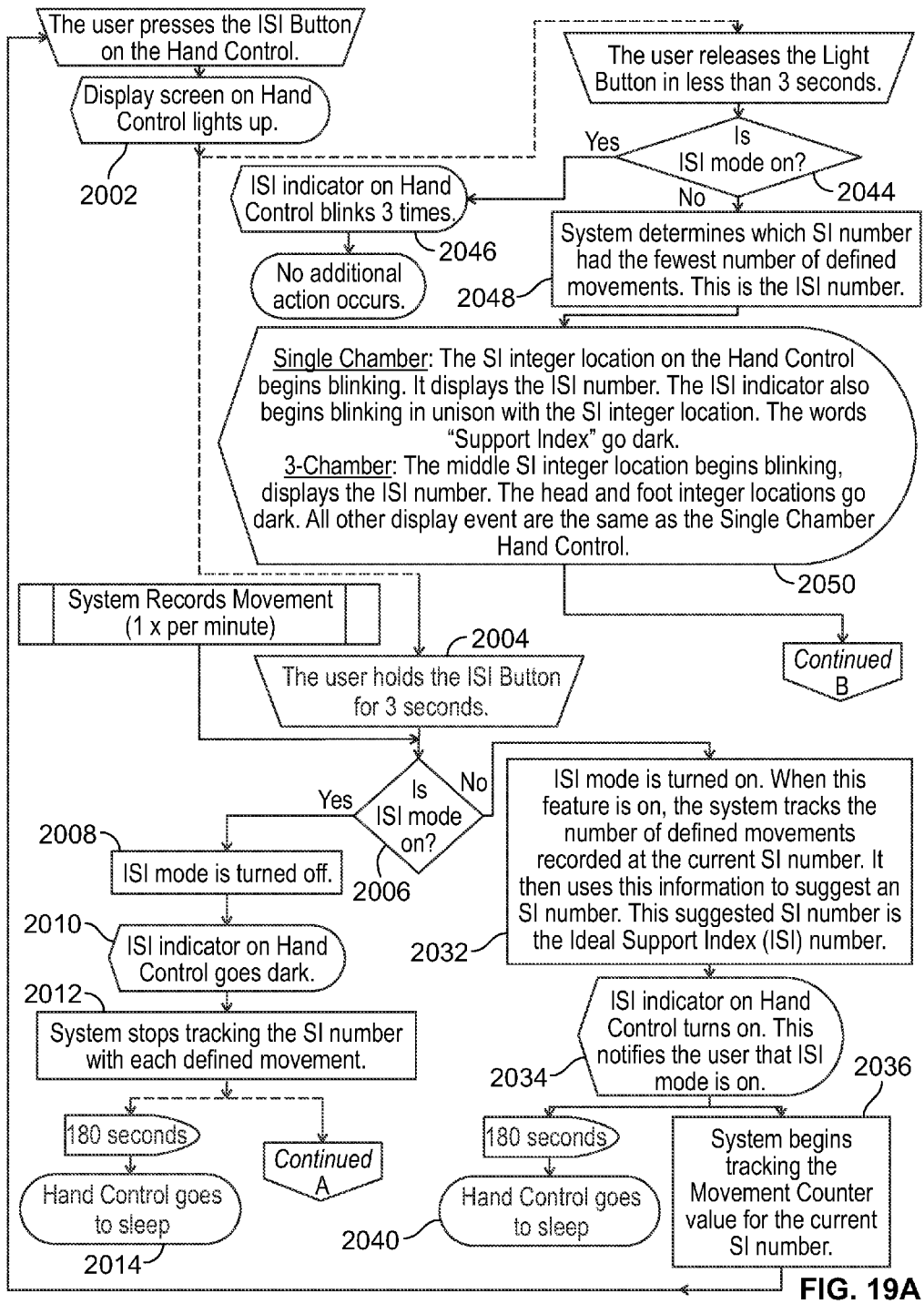
Figure 19B:
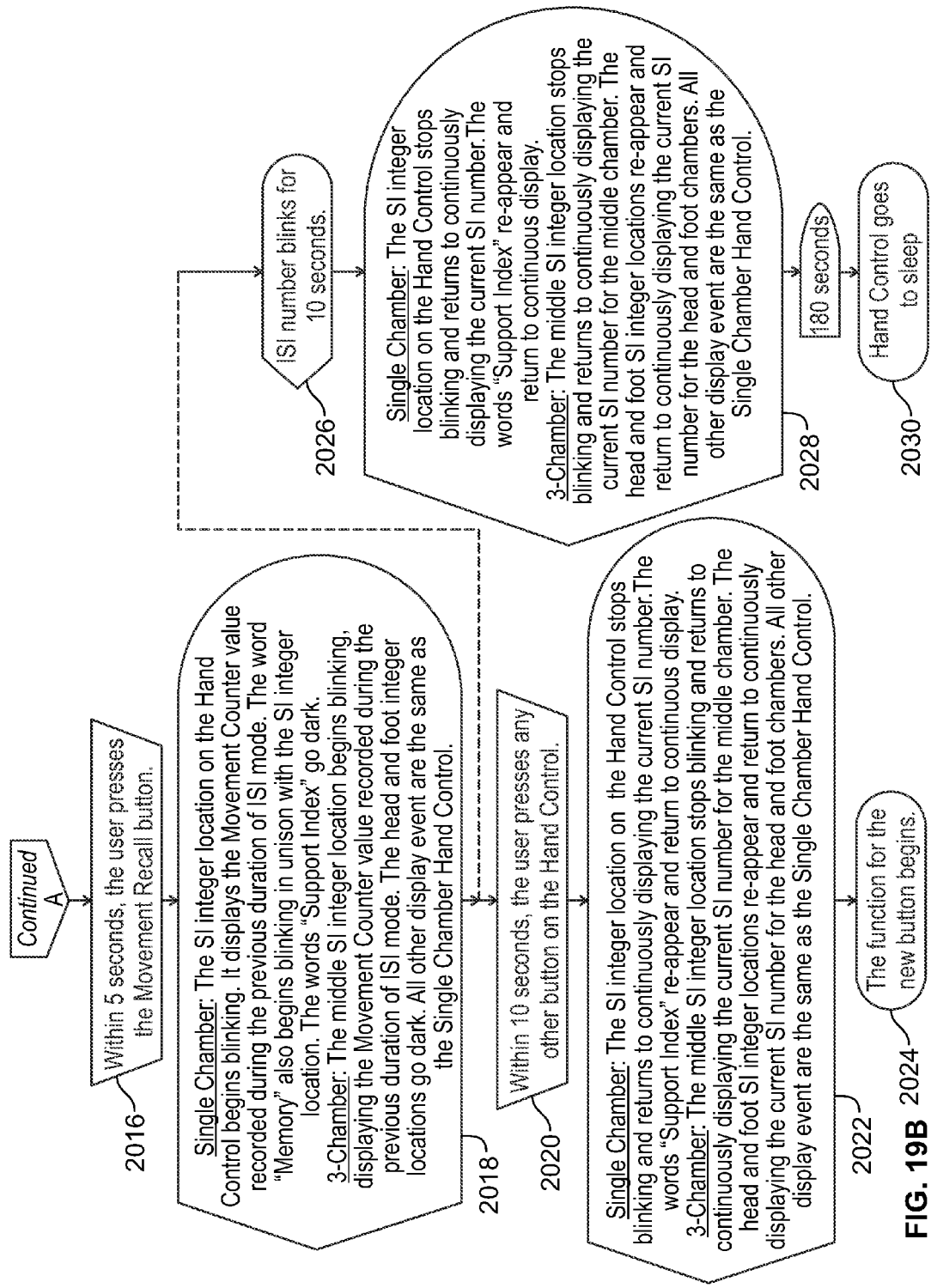
Figure 19C:
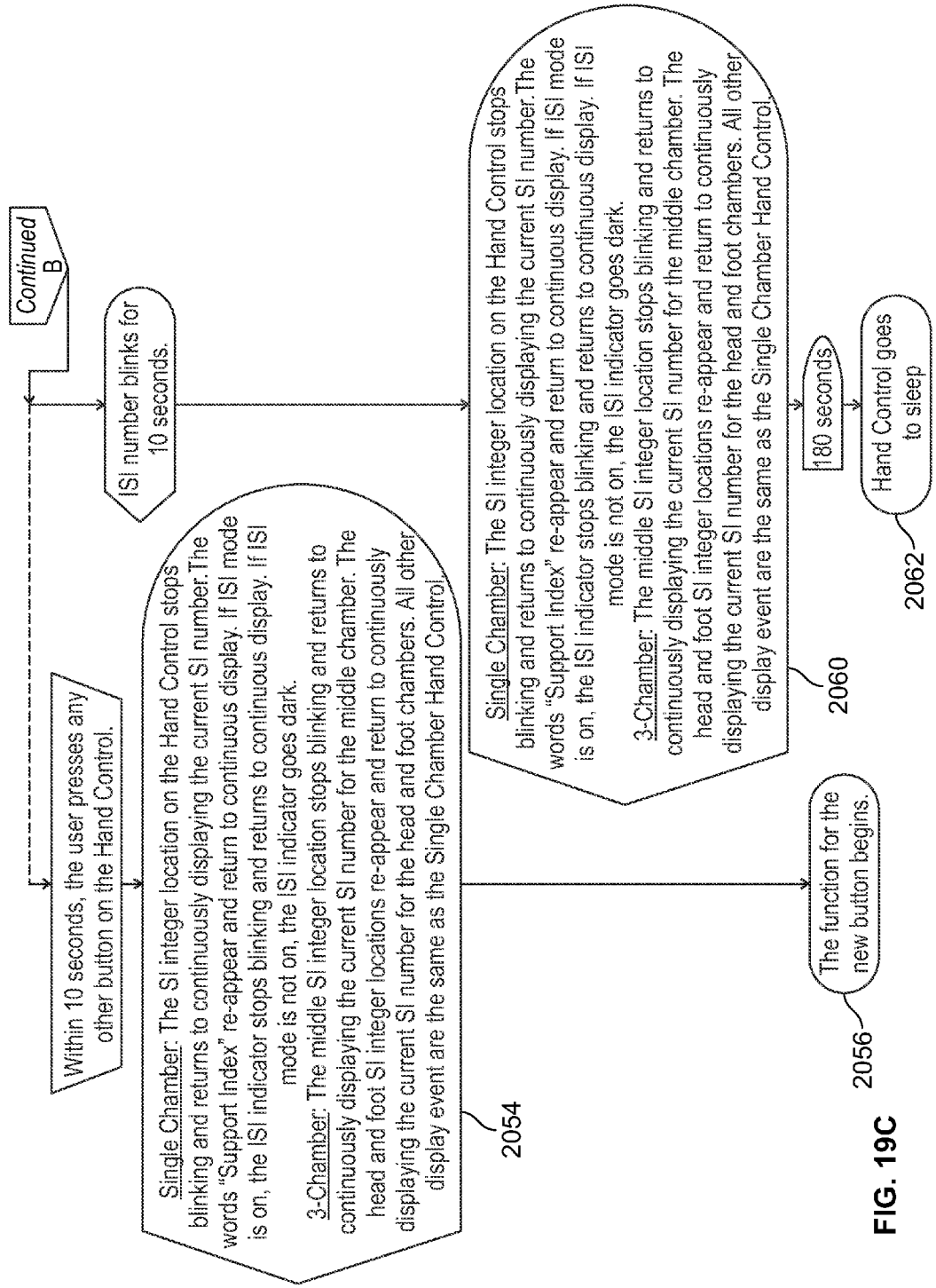
Figure 20:
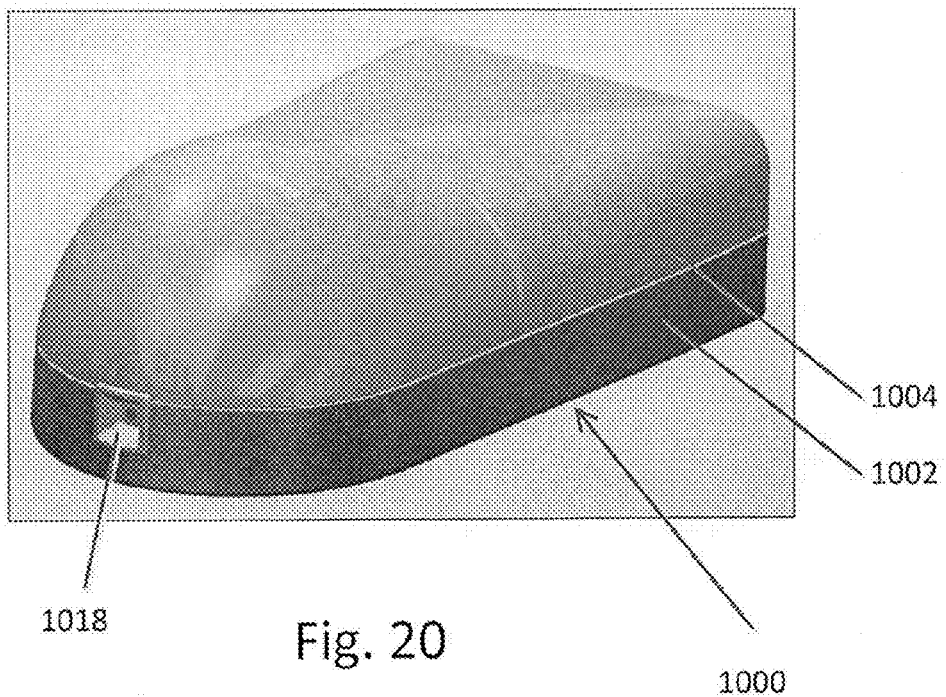
Figure 21:
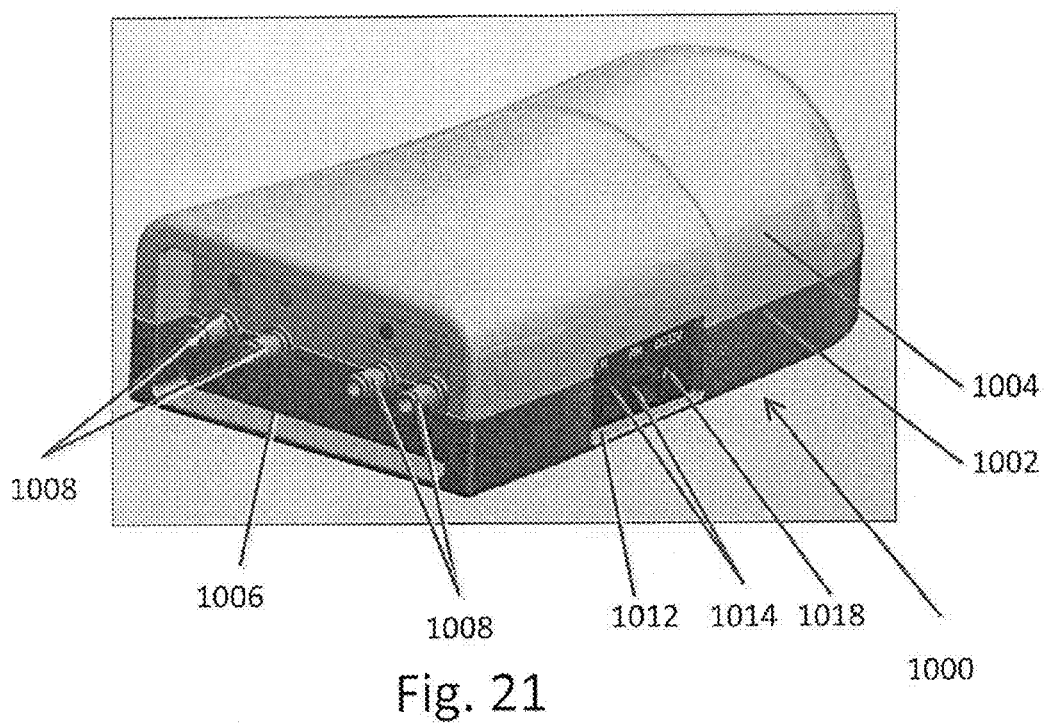
Figure 22:
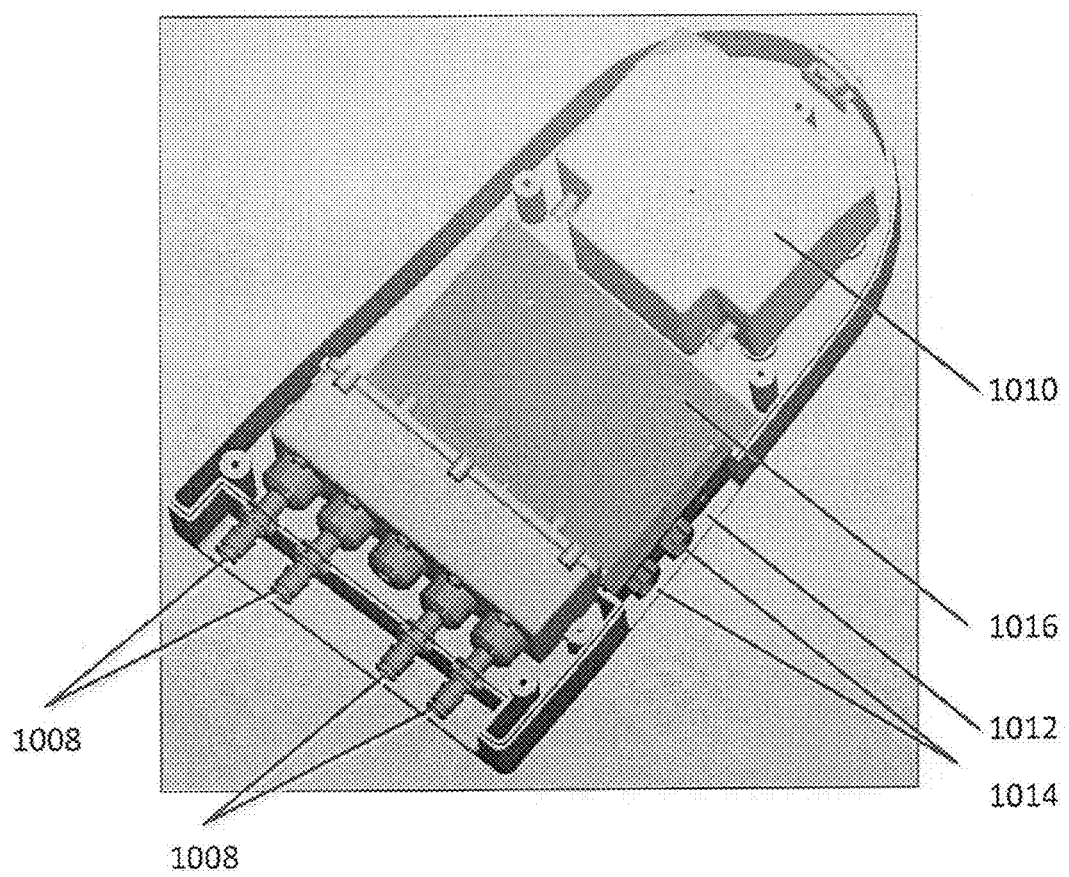
Figure 23:
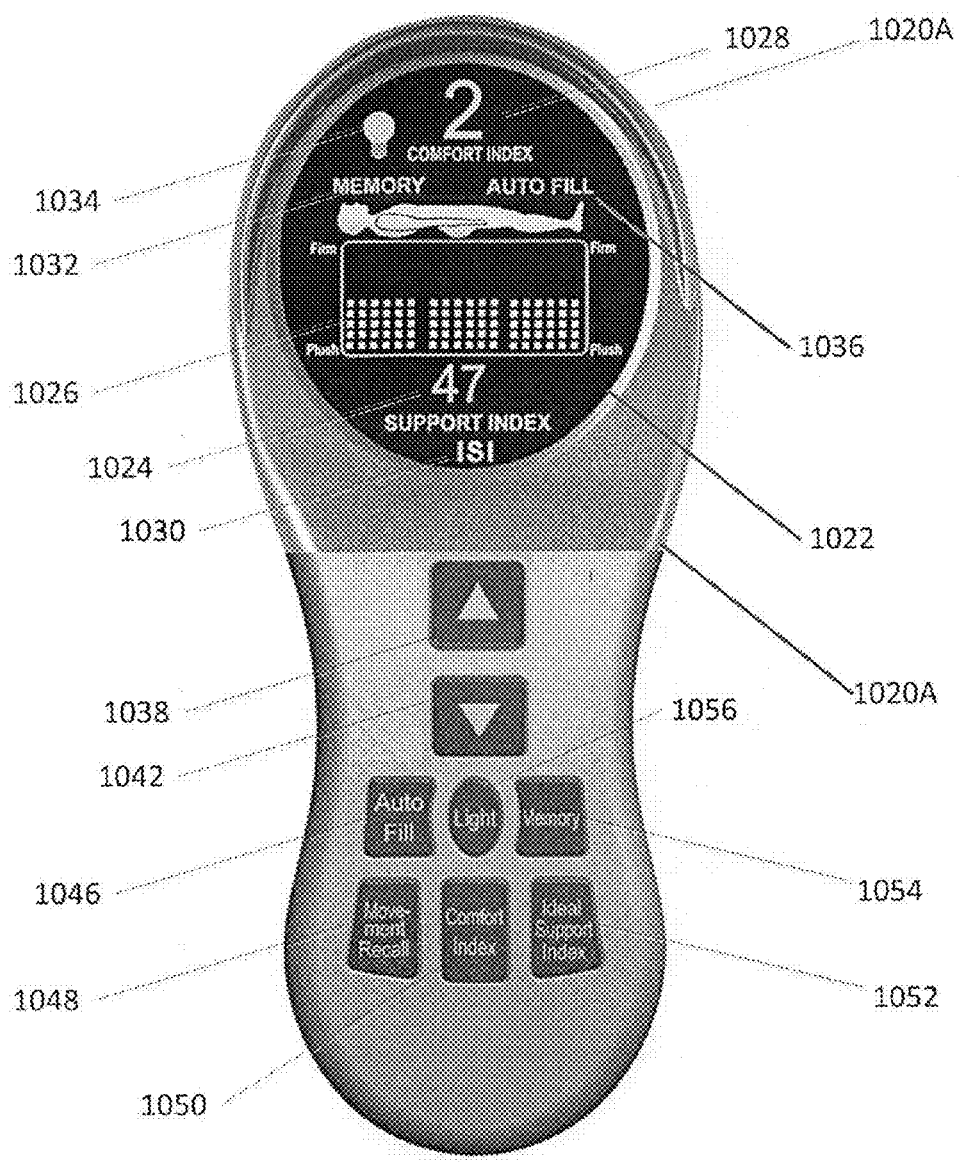
Figure 24:
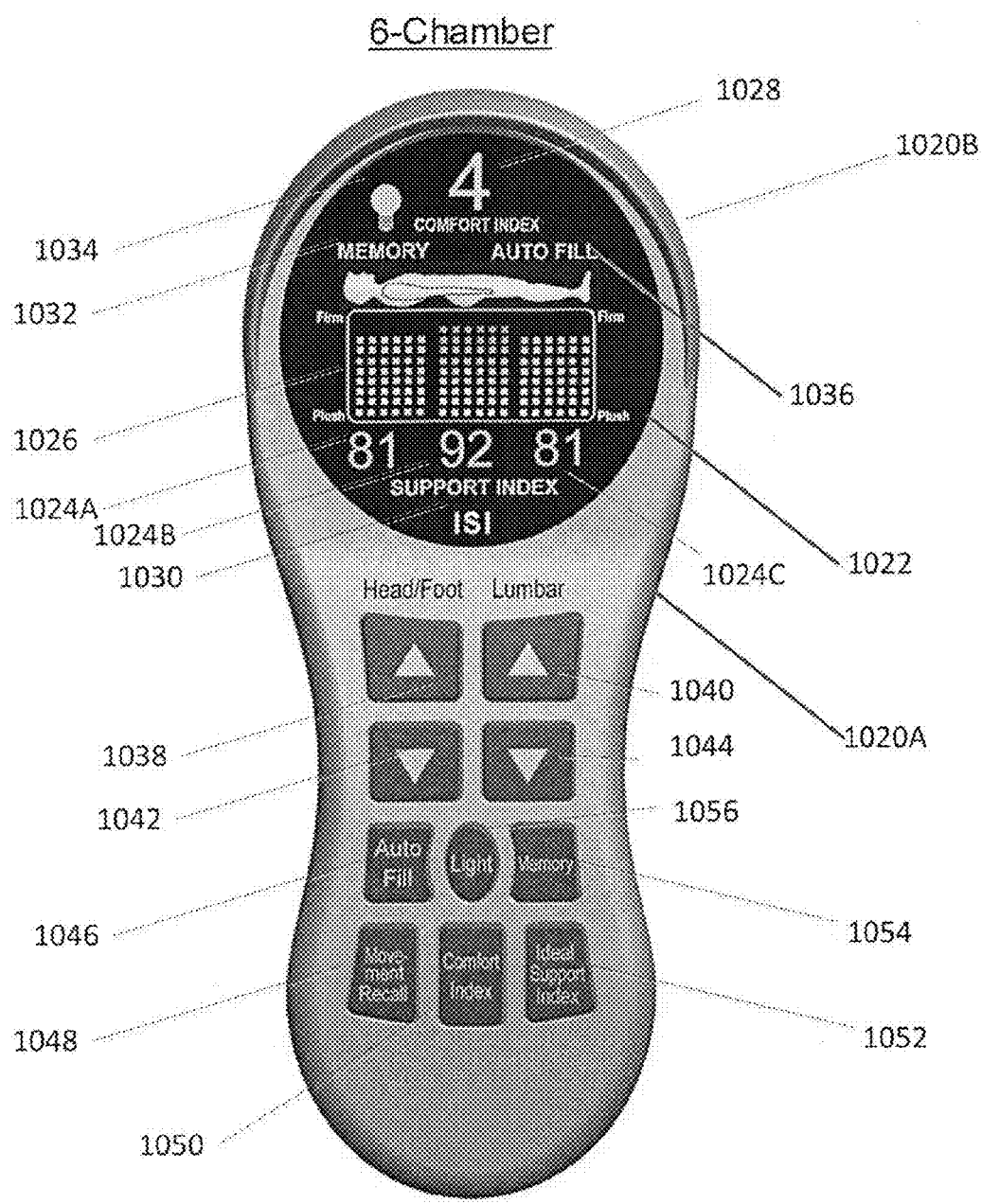
Figure 25:
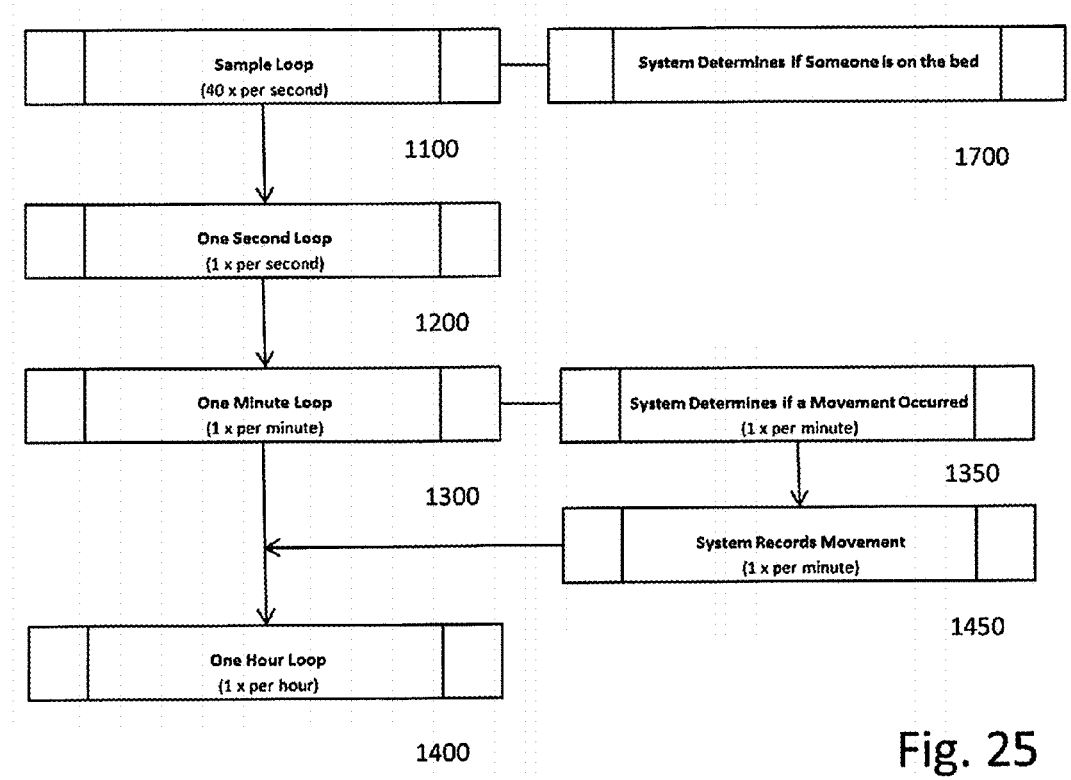
Figure 26:
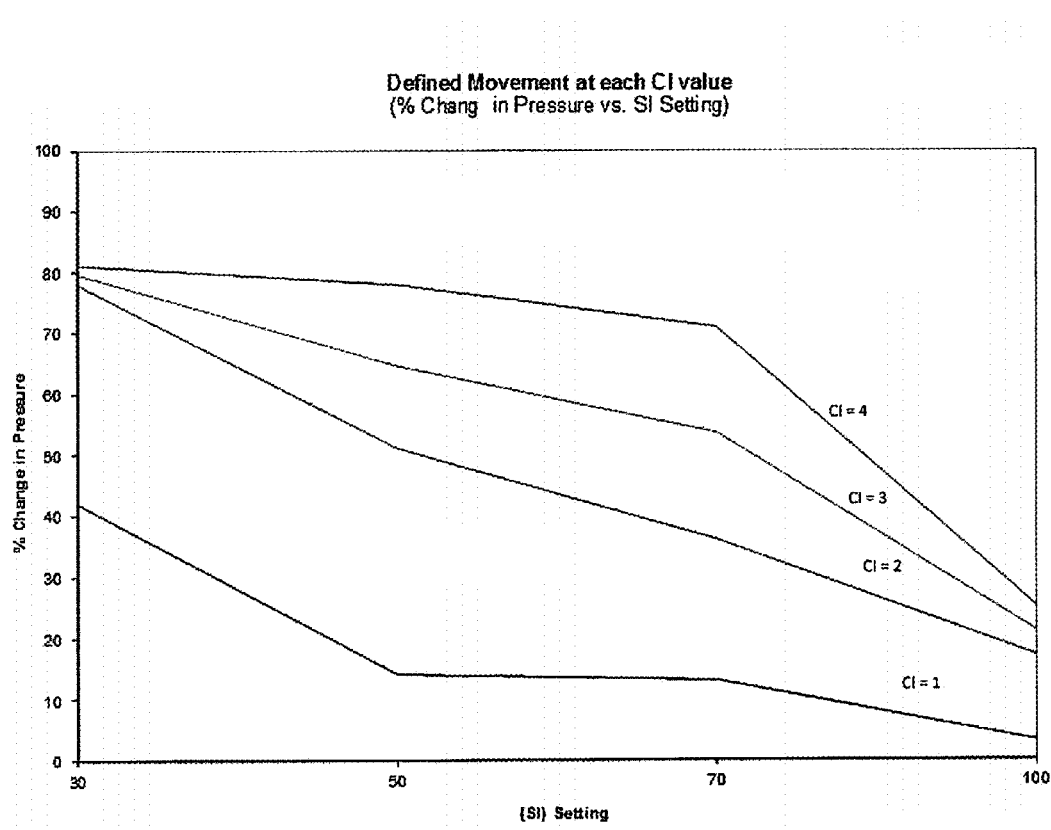

FIGS. 18A-B are a flow chart of the logic for operating the comfort index button on some controllers of the various embodiments of this invention;

FIGS. 19A-C are a flow chart of the logic for operating the ideal support index button on some controllers of the various embodiments of this invention;

FIG. 20 is a front perspective view of a preferred embodiment of a pump and control unit for an air mattress in accordance with the principles of this invention;

FIG. 21 is a rear perspective view of the pump and control unit for an air mattress;

FIG. 22 is a perspective view from below of the pump and control unit for an air mattress, with the base removed;

FIG. 23 is a top plan view of a preferred embodiment of a controller for operating a pump and control unit for single chamber air mattress;

FIG. 24 is a top plan view of a preferred embodiment of a controller for operating a pump and control unit for multiple chamber air mattress;

FIG. 25 is a flow chart of one possible method implemented by a control for monitoring pressure in an air mattress system; and FIG. 26 is a graph showing a possible relationship between the definition of movement, and SI and CI settings.

Corresponding reference numerals indicate corresponding parts throughout the several views of the drawings.

DETAILED DESCRIPTION

Example embodiments will now be described more fully with reference to the accompanying drawings.

Figure 1:
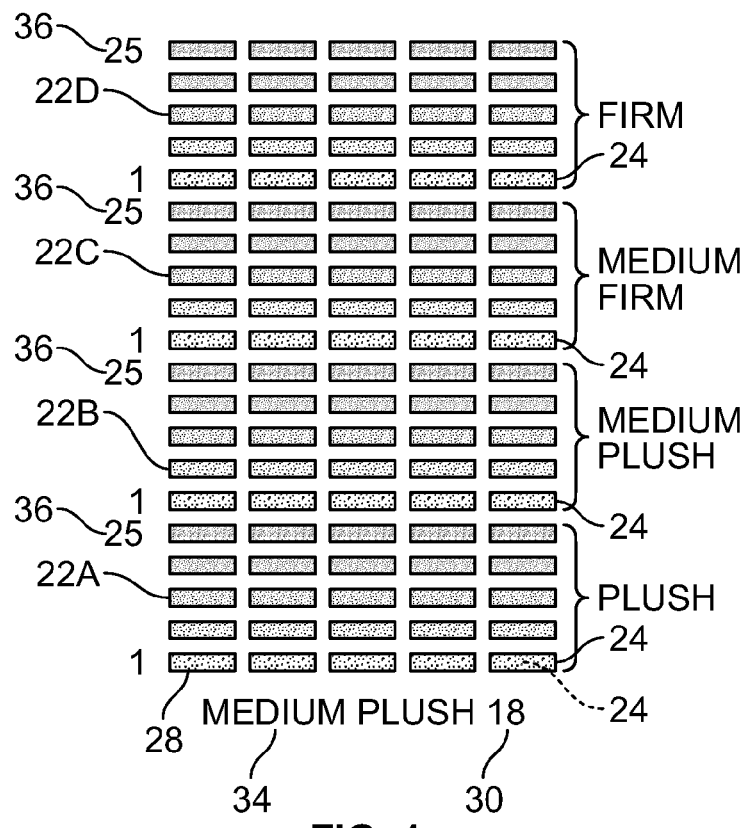
FIG. 1 is a schematic diagram of a display in accordance with a first preferred embodiment of this invention.
Figure 2:
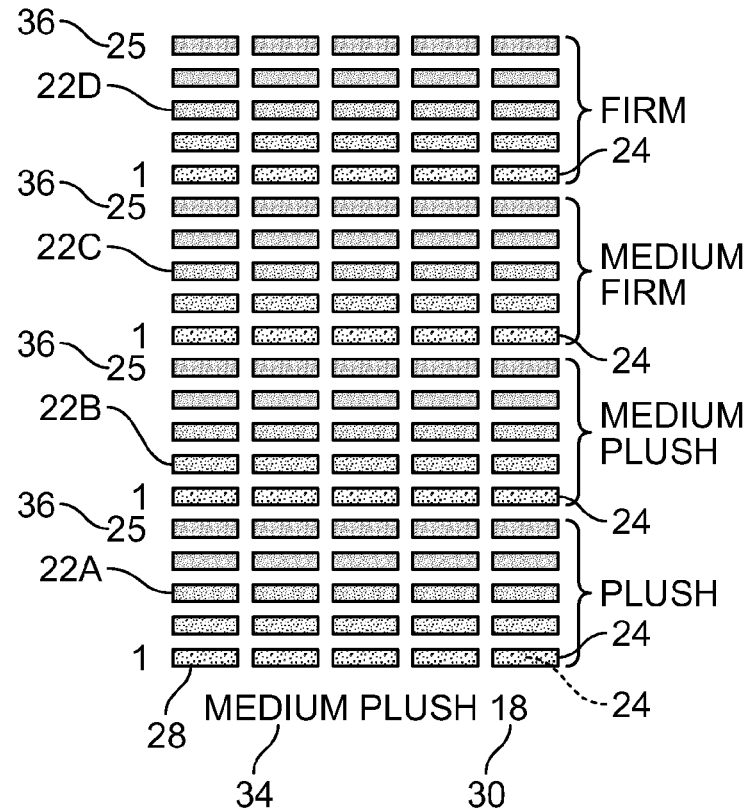
FIG. 2 is a schematic diagram of a display in accordance with a the first preferred embodiment.

A first preferred embodiment of a display for use with air cushions, such as air mattresses, in accordance with the principles of the present invention is indicated generally as 20 in FIGS. 1 and 2.

The display 20 comprises a plurality of arrays 22 of elements 24 organized in a hierarchy. In this preferred embodiment there are four arrays 22A, 22B, 22C, and 22D, but there could be fewer or more arrays. Each of the arrays 22 is a different color, for example the elements 24 in array 22A can be dark blue, the elements in array 22B can be green, the elements in array 22C can be purple, and the elements in array 22D can be light blue. Of course the arrays could be other colors, or all the arrays could be the same color. For example each array could be different shade of the same color, corresponding in color intensity (or other property) to the increase in pressure. Each of the elements 24 represents a pressure increment. The elements 24 preferably each indicate the same pressure increment, but could represent different pressure increments. For example, the value of an element could depend upon its location.

Each array 22 preferably comprises a plurality of rows 26 of a plurality of columns 28 of elements. In this preferred embodiment, each array comprises five rows 26 of five columns 28, for a total of 25, but there could be some other number of elements in the array, and/or some other number of rows and/or columns.

The elements 24 in each row 26 of an array 22 are preferably distinctive in appearance from the elements in the other rows of the array. For example, the elements 24 of each row could have a different intensity, a different shade, tint, tone, hue, or chroma. A control (not shown) operates the elements 24 to indicate the pressure beginning with the first column, of the first row, of the lowest array in the hierarchy. When the pressure increases, the next element 24 is activated, i.e., the element in the next column of current row, or when the current row is completed, the first column of the next row, or when all the rows are completed, the first column of the first row of the next array, is activated. Similarly, when the pressure decreases, the last element 24 that was activated, i.e., the activated element in the highest (in rank) column, of the highest (in rank) row, of the highest (in rank) array, is deactivated.

The display 20 preferably further comprises an indicator 30 that displays a numerical value corresponding to the value being displayed by the elements 24. This numerical value can correspond to the total number of elements that are actuated but preferably is the total number of elements that are actuated in the highest array in the hierarchy which has an actuated element. Where each array 22 preferably has a unique color, the numerical value is preferably displayed on the indicator 30 in the same color as the highest array in the hierarchy which has an activated element.

The display 20 preferably also includes an indicator (not shown) that displays an alphanumeric character corresponding to the highest array in the hierarchy which has an activated element. This value is preferably displayed in the same color as the highest array in the hierarchy which has an activated element.

Each of the arrays of the display is preferably assigned a descriptive name, and the display 20 preferably includes an indicator 34 that displays the descriptive name corresponding to the highest array in the hierarchy which has an activated element, and this name is preferably displayed in the same color as the highest array in the hierarchy which has an activated element. In this preferred embodiment the arrays 22 can have the associated descriptive name "plush" for array 22A, "medium plush" for array 22B, "medium firm" for array 22C, and "firm" for array 22D. Of course fewer, additional, or different names could be used.

The display 20 shown in FIG. 1 has all the elements in array 22A activated, and 18 of the elements in array 22B activated. Consequently, the indicator 34 has the name "medium plush" displayed in the color associated with array 22B, and indicator 30 has the number 18 displayed in the color associated with array 22B. Labels 36 can be provided to advise the user of the total number of indicators in each array, to provide a context for the number displayed by indicator 30.

The display 20 shown in FIG. 2 has all the elements in arrays 22A, 22B, 22C, and 22D activated. Consequently, the indicator 34 has the name "firm" displayed in the color associated with array 22D, and indicator 30 has the number 25 displayed in the color associated with array 22D.

Figure 3:
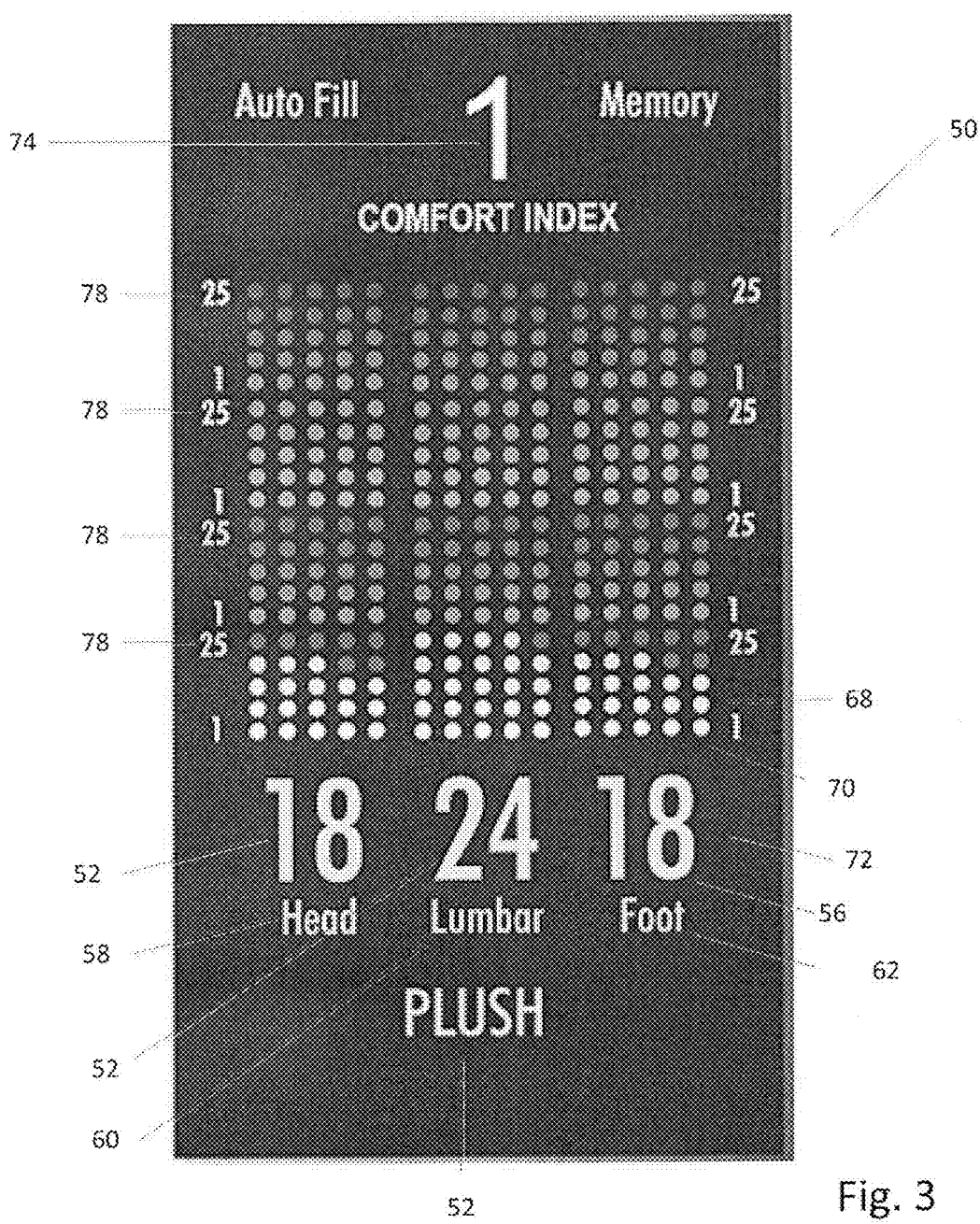
FIG. 3 is a front elevation view of a display in accordance with a second preferred embodiment of this present invention.
Figure 4:
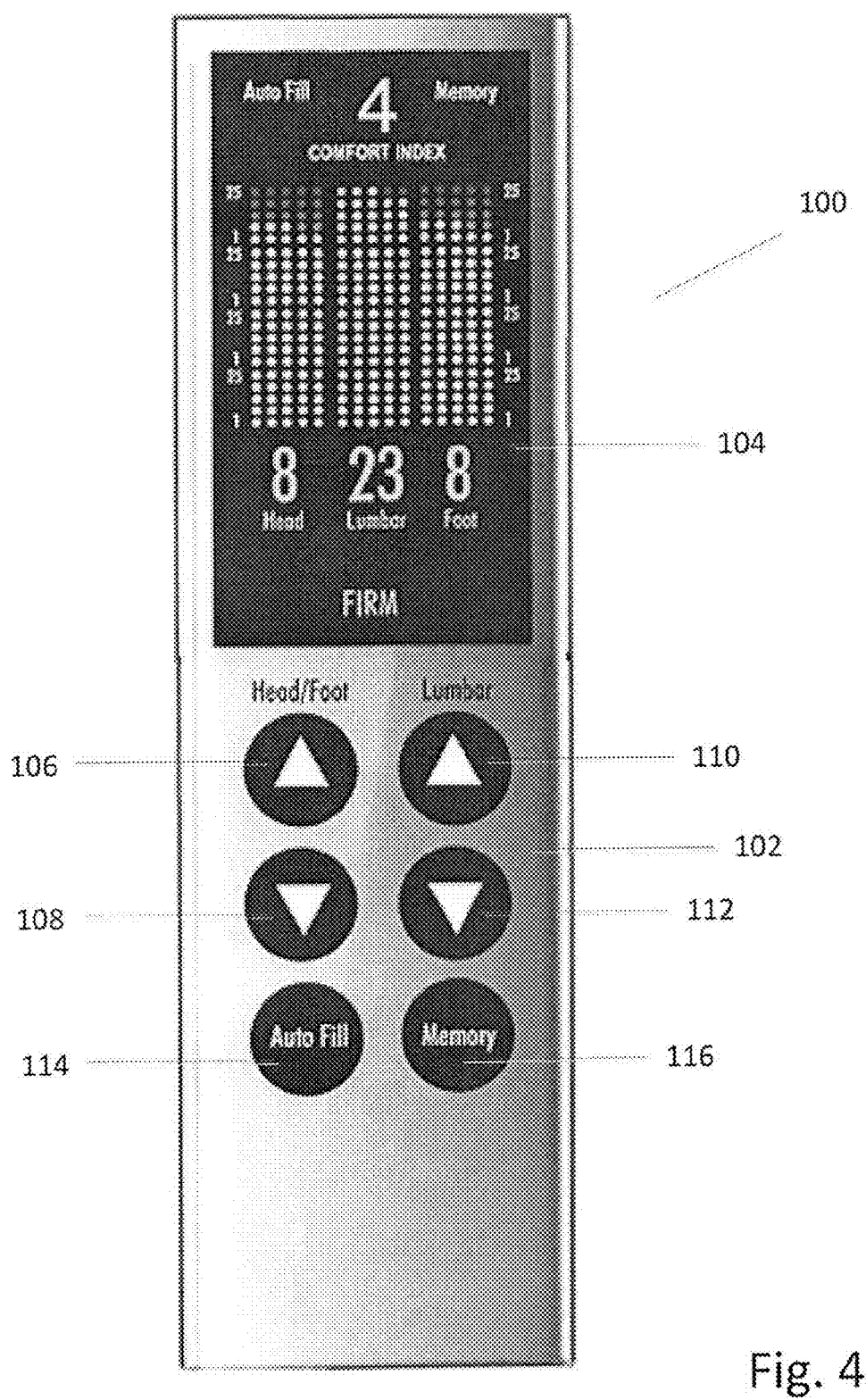
FIG. 4 is a front elevation view of a first embodiment of a controller incorporating a display in accordance with the principles of the present invention.
Figure 5:
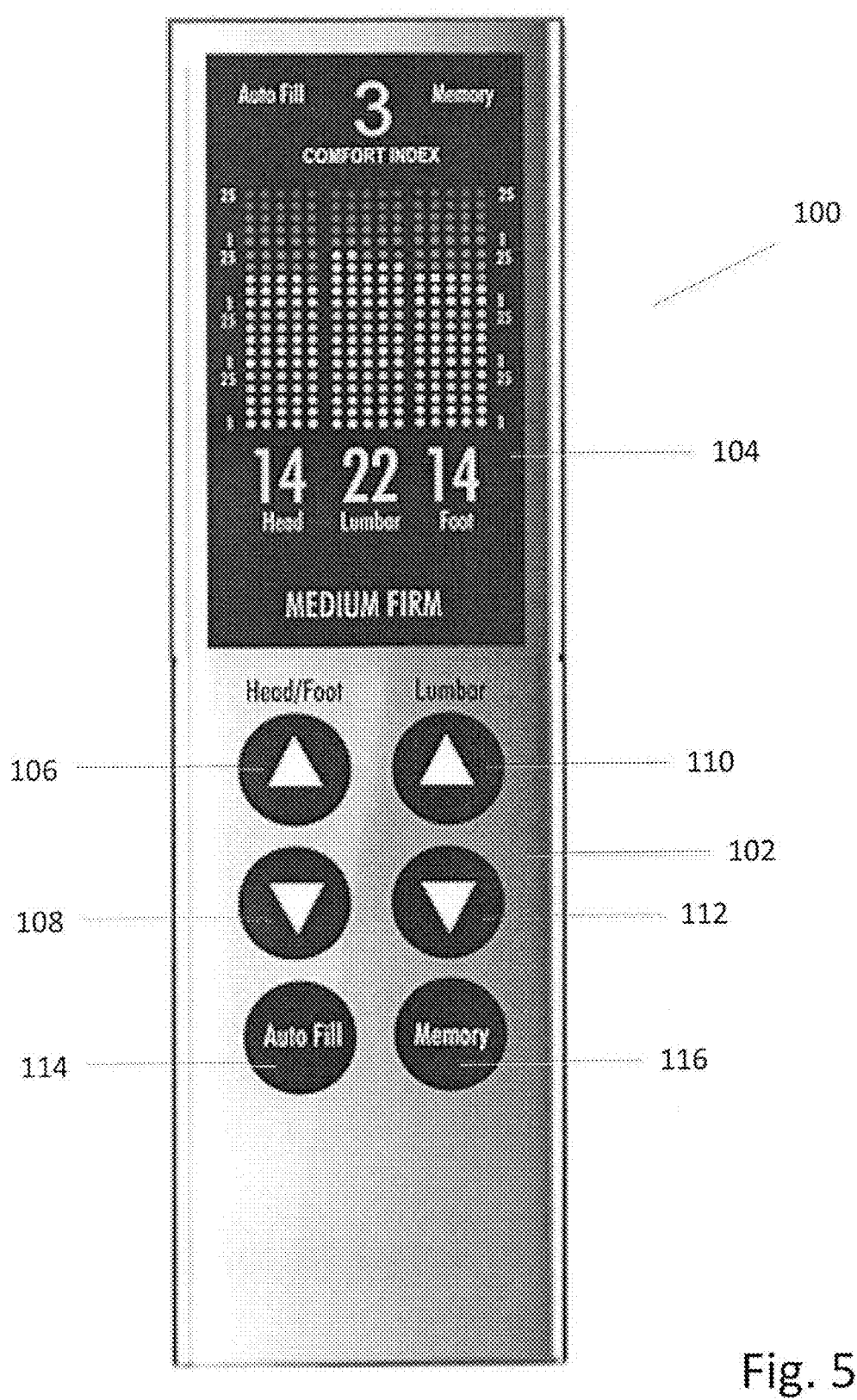
FIG. 5 is a front elevation view of the controller incorporating a display in accordance with the principles of this invention.
Figure 6:
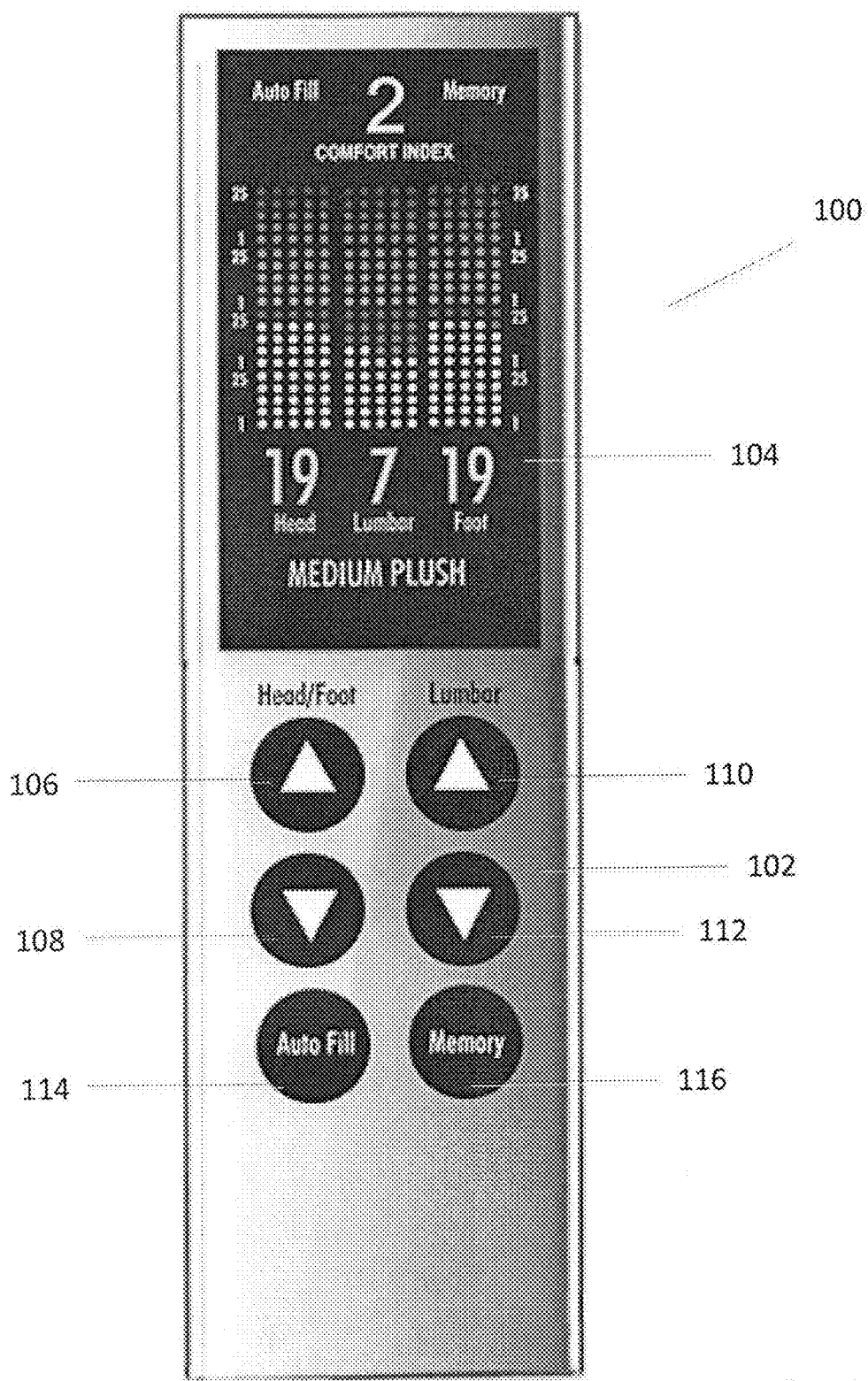
FIG. 6 is a front elevation view of the controller incorporating a display in accordance with the principles of this invention.
Figure 7:
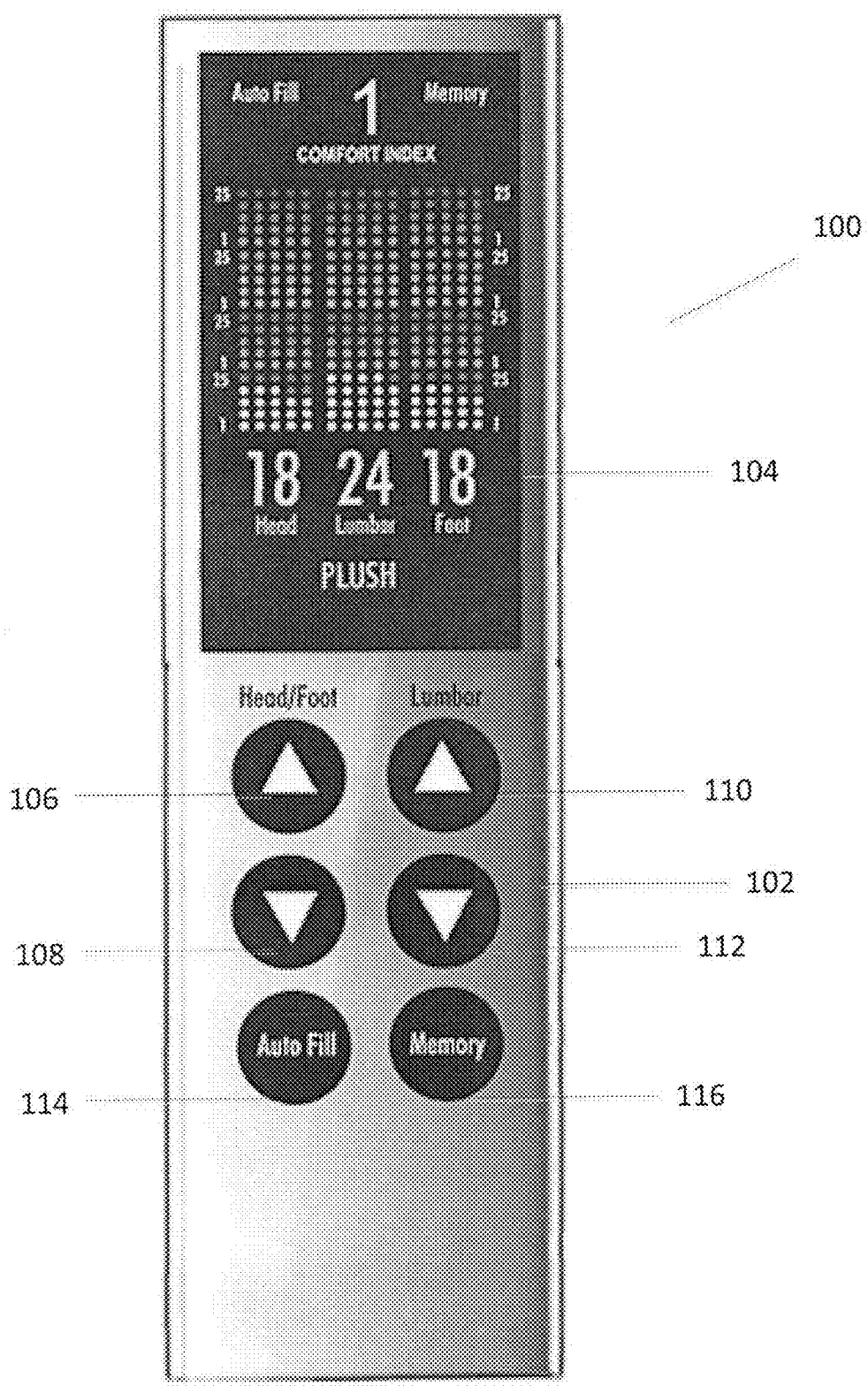
FIG. 7 is a front elevation view of the controller incorporating a display in accordance with the principles of this invention.

A second embodiment of a display is indicated generally as 50 in FIG. 3. The display 50 is adapted for use with a multi-chamber air mattress. In this particular embodiment, the display 50 is adapted for use with a mattress having a head, a lumbar, and a foot chambers (although the head and foot chambers are interconnected, and therefore have the same pressure), and has subdisplays 52, 54, and 56 each with a descriptive label 58, 60, and 62 identifying the chamber whose pressure is indicated by the particular subdisplay.

Each of the subdisplays 52, 54, and 56 comprises a plurality of arrays 64 of elements 66 organized in a hierarchy. In this preferred embodiment each of the subdisplays has four arrays 64A, 64B, 64C, and 64D, but there could be fewer or more arrays. Each of the arrays 64 is a different color, for example the elements 66 in array 64A can be blue, the elements in array 66B can be green, the elements in array 66C can be yellow, and the elements in array 66D can be orange. Of course the arrays could be other colors, or all the arrays could be the same color. For example each array could be different shade of the same color, corresponding in color intensity (or other property) to the increase in pressure. Each of the elements 66 represents a pressure increment. The elements 66 preferably each indicate the same pressure increment, but could represent different pressure increments, for example depending upon the location of the indicator.

Each array 64 preferably comprises a plurality of rows 68 of a plurality of columns 70 of elements 66. In this preferred embodiment, each array 64 comprises five rows 68 of five columns 70, for a total of 25, but there could be some other number of elements 66 in the array, and/or some other number of rows and/or columns. The elements 66 in each row 68 of an array 66 are preferably distinctive in appearance from the indicators in the other rows of the array. For example, the elements 66 of each row could have a different intensity, a different shade, tint, tone, hue, or chroma. A control (not shown) operates the elements 66 to indicate the pressure in the subdisplays respective chamber beginning with the first column, of the first row, of the lowest array in the hierarchy. When the pressure increases, the indicator 66 of the next column of current row, or when the row is completed, the first column of the next row, or when all the rows are completed, the first column of the first, row of the next array, is activated. Similarly, when the pressure decreases, the appropriate indicators are deactivated, beginning with the last indicator (i.e., the last activated column, of the last activated row, of the last activated array).

The subdisplays 52, 54, and 56, preferably further comprise an indicator 72 that displays a numerical value corresponding to the value being displayed by the elements 66. Where each array 64 preferably has a unique color, the numerical value is displayed on the indicator 72 in the same color as the highest array in the hierarchy which has an activated element.

The display 50 preferably also includes an indicator 74 that displays an alphanumeric character corresponding to the highest array in the hierarchy which has an activated element, and this value is preferably displayed in the same color as the highest array in the hierarchy which has an activated element. When multiple chambers are present, the chambers are preferably automatically controlled so that all of the chambers pressures are in the range indicated by the same array in each of the subdisplays. This means that a single indicator 74 can display an alphanumeric character corresponding to the highest array in the hierarchy which has an activated element. In other embodiments where the pressures among the chambers are not so controlled, multiple indicators 74 can be provided, one for each of the subdisplays 52, 54, and 56.

Each of the arrays 68 of the subdisplays 53, 54, and 56 is preferably assigned a descriptive name, and the display 50 includes an indicator 76 that displays the descriptive name corresponding to the highest array in the hierarchy which has an activated element, and this name is preferably displayed in the same color as the highest array in the hierarchy which has an activated element. In this preferred embodiment the arrays 64 can have the associated descriptive name "plush" for array 64A, "medium plush" for array 64B, "medium firm" for array 64C, and "firm" for array 64D. Of course fewer, additional, or different names could be used.

As described above when multiple chambers are present the chambers are preferably automatically controlled so that all of the chambers' pressures are in the range indicated by the same array in each of the subdisplays. This means that a single indicator 76 can display the name corresponding to the highest array in the hierarchy which has an activated element. In other embodiments where the pressures among the chambers are not so controlled, multiple indicators 76 can be provided, one for each of the subdisplays 52, 54, and 56.

The subdisplays 52 and 56 shown in FIG. 3 have 18 elements 66 in array 64A activated. Consequently, the indicator 76 has the name "plush" displayed in the color associated with array 64A, and indicator 72 has the number 18 displayed in the color associated with array 64A. Labels 78 can be provided to advise the user of the total number of elements in each array, providing contact for the number shown by indicator 72. The subdisplay 54 shown in FIG. 3 has 24 of the elements in array 64A activated. Consequently, the indicator 72 has the number 24 displayed in the color associated with the array 64A.

According to another embodiment, a controller according to a first preferred embodiment, indicated generally as 100, is provided for controlling the pressure in an air cushion, such as an air mattress, for example by operating a control associated with one or more air pumps. The preferred embodiment of this controller 100 (shown in FIGS. 4-7) preferably comprises a plurality of controls 102 for operating a pressure system (including a pump and a control) to change the pressure in the air mattress, and at least one display 104 in accordance with this disclosure.

The controller 100 can be adapted for controlling the pressure in each of the chambers of a multi-chamber air mattress, for example a mattress having a head, a lumbar, and a foot chambers (although the head and foot chambers are typically interconnected, and therefore have the same pressure). The controller 100 preferably has controls for operating a pressure system (such as an air pump that pumps air into or out of the chamber), and may include buttons 106 and 108 for increasing and decreasing the pressure in the head and foot chambers, and buttons 110 and 112 for increasing and decreasing the pressure in the lumbar chamber. The controller can include other controls for example an auto-fill button 114 that operates the pressure system to fill the chambers to a either a predetermined factory setting, or a previously stored user setting. The controller can also include a memory button 116 that saves the current user determined settings, so that pressing the auto-fill button 114 automatically restores the mattress to previously saved user setting. Of course additional or different controls could be provided in the controller 100 if desired. For example a single set of pressure increase and decrease buttons could be provided, and a selector control that allows the user to select the chamber to be controlled by the single set of pressure increase and decrease buttons.

As the pressure in the chambers is changed, the display 104, which is preferably constructed according to the principles of this invention, for example display 50, is updated. The display 50 provides detailed feedback information to the user so that the user can better control the pressure in the chambers for maximum comfort. The display 50 provides a numerical display of the current pressure in each chamber though indicators 72, which display a numerical value for the current region or comfort index. The display 50 also provides a graphical display of the total current pressure in each chamber (through the arrays 64 of elements 66) so that the users can better visualize the pressure value and better visually interpret the pressure differences between the chambers. The display 50 also displays both a numerical and verbal cue to the level of firmness corresponding to the current pressure, through indicators 74 and 76 and a visual cue through the color coordination of the indicators 72, 74, and 76.

The controller 100 can be implemented as a wired device connected to the pressure system via a wire (not shown). Alternatively, the controller 100 can be implemented as a wireless device, with the controller wireless connected to the pressure system, for example by a Bluetooth, Wi-Fi, ZigBee, x10, Z-Wave, radio frequency (RF), infrared or other wireless connection. The controller may even be implemented as a program (app) running on a smart phone or a tablet. In the case of a smart phone or tablet, the controls may be virtual buttons, sliders, or other types of control elements displayed on the screen of the device, which can be operated by the user. Similarly the display portion 50 of the controller 100 can be implemented by a plurality of lit, partially lit, or unlit areas on the screen of the device. Unactivated elements may be completely blank or they may be outlined or partially lit to give the user a sense of how many elements are activated and how many elements are not activated.

Figure 8:
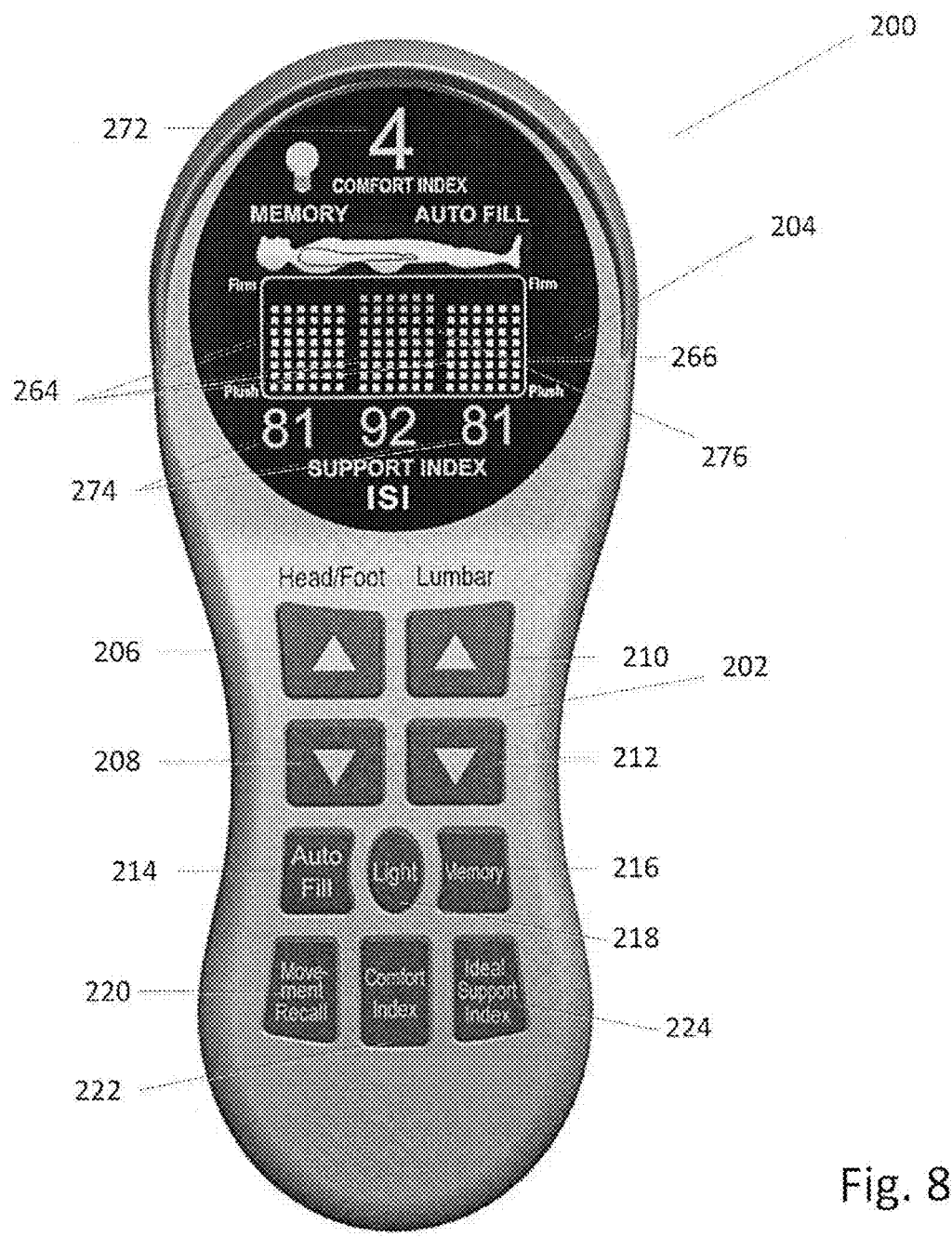
FIG. 8 is a front elevation view of a second embodiment of a controller incorporating a display in accordance with the principles of the present invention.

According to another embodiment, a controller according to a second preferred embodiment, indicated generally as 200, is provided for controlling the pressure in an air cushion, such as an air mattress. The preferred embodiment of this controller 200 (shown in FIG. 8) preferably comprises a plurality of controls 202 for operating a pressure system to change the pressure in the air mattress, and at least one display 204 in accordance with this disclosure.

The controller 200 can be adapted for controlling the pressure in each of the chambers of a multi-chamber air mattress, for example a mattress having a head, a lumbar, and a foot chambers (although the head and foot chambers are typically interconnected, and therefore have the same pressure). The controller 200 preferably has controls 202 for operating a pressure system (such as an air pump in an pump and control unit that pumps air into or out of the chamber), and may include buttons 206 and 208 for increasing and decreasing the pressure in the head and foot chambers, and buttons 210 and 212 for increasing and decreasing the pressure in the lumbar chamber. The controller can include other controls for example an auto-fill button 214 that operates the pressure system to fill the chambers to a either a predetermined factory setting, or a previously stored user setting. The controller can also include a memory button 216 that saves the current user determined settings, so that pressing the auto-fill button 214 automatically restores the mattress to previously saved user setting.

Of course additional or different controls could be provided on the controller 200 if desired. For example a single set of pressure increase and decrease buttons could be provided, and a selector control that allows the user to select the chamber to be controlled by the single set of pressure increase and decrease buttons.

Figure 16A:
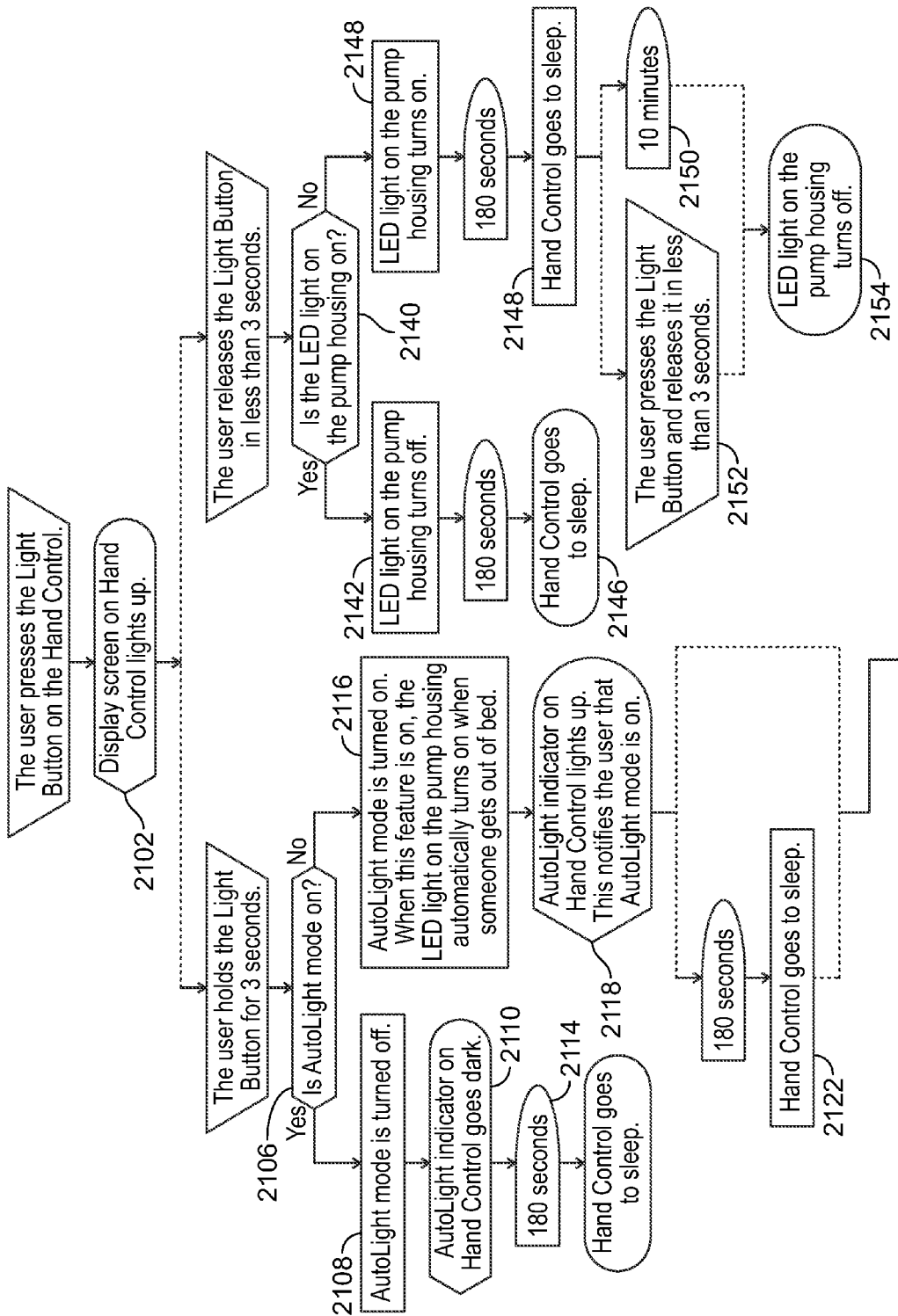
FIGS. 16A-B are flow charts of the logic for operating the light button on some controllers of the various embodiments of this invention.

Alternatively or in addition a light control button 218 can be provided for controlling a light (on the controller 200 or elsewhere). The button 218 operates a control whose logic is set forth in FIGS. 16A and 16B, and described in detail below. The light control button 218 is pressed to turn the light function on or off. When the light function is on, an LED light associated with the mattress (e.g., with a pump and control unit controlling the pressure) is activated whenever the sensed pressure in the mattress is reduced to a level that indicates that a person has exited the mattress. The light stays on for a predetermined period, e.g., 10 minutes, or until the pressure sensor recognizes that the person has returned to the mattress or when the light control button 218 is operated again.

If the light associated with the mattress is off, then pressing the light control button 218 will turn it ON. If the light associated with the mattress is on, then pressing the light control button 218 will turn it off.

When a pressure sensor associated with the mattress recognizes a significant decrease in pressure (e.g., when an individual gets out of bed), the light will turn on automatically. A "significant decrease" may be calculated by a predetermined reduction (e.g., of at least 20%) of the pressure (regardless of the particular pressure reading at the time) and that reduction is maintained for a predetermined minimum period (e.g., 2 seconds).

When a mattress pressure sensor recognizes a "significant" increase in pressure (e.g., when an individual gets of back into bed), the light will turn off automatically. A "significant increase" may be determined by an increase of a predetermined about (e.g., at least 20%) of the pressure (regardless of the particular pressure reading at the time), and that increase is maintained for a predetermined minimum (e.g., 2 seconds).

The automatic light feature preferably can be deactivated, for example if the light control button is pressed for a predetermined period, e.g. 3 seconds or more, and the automatic pressure sensing function is deactivated or ignored. In this mode, the only way to turn the light on or off would be to press the button (preferably for less than 3 seconds, because holding the button for 3 seconds would preferably toggle on the pressure sensing feature. The air pump preferably includes a control with software activated to sense the pressure change to engage or disengage the light. Whether the automatic pressure sensing feature is engaged can be indicated by an indicator, e.g. indicator 219 on the display 204.

The controller 200 can also include a movement recall button 220, that operates a control whose logic is set forth in FIG. 17, and described in detail below. When the user wakes up in the morning, the user can press the movement recall button 220, and the display 204 will display the number of movements recorded over a predetermined period of time (e.g., 10 hours). The number of defined movements recorded over the previous predetermined period of time can be displayed for example in a blinking mode for, for example 10 seconds, in the Support Index number area 274. This will temporarily replace the Support Index number (which can be distinguished because it is in a different color and/or because it does not blink). Alternatively it can be displayed in a separate location. When the movement recall number stops blinking the previous Support Index number will reappear (without blinking) and go to sleep after a predetermined period, e.g. 180 seconds. If any other button is pressed when the movement recall digits are blinking then the movement routine will stop and the new routine (e.g., the auto fill, memory etc.) will engage.

The controller 200 can also include a Comfort Index button 222 that operates a control whose logic is set forth in FIGS. 18A and 18B, and described in detail below. The Comfort Index button 222 establishes the weight and weight distribution of the individual as well as a recommended mode of operation, e.g., a pressure category as expressed in a numerical index. This Comfort Index indicates the appropriate range of recommended support index numbers that would be appropriate for that individual's body profile. An individual's height and weight ratio determines the pressure they will exert on the air mattress which is translated by the pressure sensor(s) to one of 4 categories. Once an individual's Comfort Index is established, it may be used as a modifier with the software function that determines/defines a movement. For example, a person that is 5' 2" weighing 100 lbs. might register as a Comfort Index of 1. A person of this body profile may only register a very small pressure percentage change when making a movement at the higher mattress pressure levels compared to a person that is 5' 2" weighing 250 lbs. For example, if the air mattress pressure was 0.48 and an individual with a Comfort Index of 1 turned from their back to their side, it may only affect the pressure (in PSI) by 0.003, but an individual with a Comfort Index of 4 who moves from their back to their side may affect the pressure (in PSI) by 0.01. The software running on the control can adjust the operation of the various functions, including the motion sensing, increasing sensitivity for lower Comfort Indexes and decreasing sensitivity for higher comfort indexes. Similarly, the Comfort Index numbers can be used in determining a Support Index setting that the system would recommend for the individual to begin sleeping upon first installing the bed. This Support index can be based upon the pressure reading generated from setting the Comfort Index to a predetermined value, and then having the individual lie on the mattress and press the Comfort Index to determine a pressure reading and translate it into a Comfort Index value, for example 1, 2, 3 or 4. Of course some other numbering or lettering scheme could be used rather that 1, 2, 3 or 4. For example fewer or more numbered levels could be provided, or other labels for example "L" for low and "H" for high, or other designations of letters, numbers, symbols, or colors could be used.

With no one lying on the mattress, the user can press the Comfort Index button 222. The control will cause the mattress to inflate to a predetermined pressure. The user then lies on the mattress, and the change of pressure can be measured. A signal, such as a blinking display, can indicate when the measurement process is taking place. The determined pressure differential can be used to determine a Comfort Index number (i.e., 1, 2, 3, 4) and display that number and the word "Comfort Index" at the top of the LCD hand control area.

For example if a Comfort Index 1 was indicated, the Support Index indicator would blink, (e.g., for 10 seconds) the specific number, for example 20, associated with the pressure reading which would correspond to a Support Index (pressure reading) of 1 to 35=Comfort Index 1. If Comfort Index 2 was indicated, the Support Index indicator would blink 55 for 10 seconds, the specific number associated with the pressure reading which would correspond to a Support Index (pressure reading) of 35 to 55=Comfort Index 2. If Comfort Index 3 was indicated, the Support Index indicator would blink, for example 70, for 10 seconds the specific number associated with the pressure reading which would correspond to a Support Index (pressure reading) of 56 to 75=Comfort Index 3. If Comfort Index 4 was indicated, the Support Index indicator would blink, for example 85, for 10 seconds, the specific number associated with the pressure reading which would correspond to a Support Index (pressure reading) of 76 to 100=Comfort Index 4

The controller 220 can also include an Ideal Support Index button 224 that operates a control whose logic is set forth in FIGS. 19A, 19B, and 19C, and described in detail below. The Ideal Support Index button is pressed occasionally to determine what the recommended Support Index should be based upon the number of defined movements that have been recorded at various different Support Index settings. For example if the history showed the following defined movements at the associated Support Index settings a setting of 65 would be recommended as this support level resulted in the fewest number of defined movements. The recommended Support Index is only one possible recommended mode of operation.

| Support Index setting | Average Defined movements over a 10 hour period |
| --- | --- |
| 55 | 82 |
| 65 | 48 |
| 75 | 63 |

When the Ideal Support Index button is pressed, the control can use some or all of the available information to determine which Support Index numbers were associated with the lowest number of movements. Based upon this determination, the specific recommended Support Index number is displayed in the Support Index area of the display 204.

The recommended SI number can blink for a predetermined period (e.g., 10 seconds), then return to the current SI number. Of course a different color or some other visual cue (instead of or in addition to blinking) can be used to differentiate the recommended number from the current number. The air pump can be provided with a control that is programmed implement the Ideal Support Index Function. When the Ideal Support Index button is pressed for more than a predetermined time (e.g., 3 seconds) it disengages the automatic recognition function and engages the "manual mode" of movement recognition. This is done to eliminate any non-sleeping movements that may occur prior to going to sleep (watching TV in bed, working on the computer in bed etc.). The individual presses the Ideal Support Index button for more than 3 seconds to engage the "manual mode" of movement recognition. They fall asleep for their night's sleep and when they wake up they press the manual mode for 3 or more seconds which preferably does two things: first it disengages the manual mode and engages the auto mode of movement recall, and second, it defines the period for when the individual was in bed and asleep.

If the Movement Recall button is pressed within 5 minutes of a second long press on the Support Index button, then only the movements recorded between the last two "long" presses of the Support Index button are indicated on the Movement Recall button.

The hand controls of the various embodiments may be wired or wireless. The hand control (or alternatively the pump control) may contain a CPU and RAM storage for the data accumulated (time and dates for each "activity", movements associated with each Support Index number, amount of time the individual slept, when the individual entered or exited the mattress, the amount of time spent snoring (if a sound detector is provided), time and direction of each adjustable base movement (if the mattress is on a movable base), the time the individual went to bed each night, the time the individual woke up each morning, the time restless leg syndrome began and ended, respiration rate (if appropriate sensors are provided), temperature every quarter hour (if a temperature sensor is provided), and mattress humidity (if a moisture or humidity sensor is provided).

In the preferred embodiments, the data storage would be contained within the hand controller. Removable memory such as USB device or an SD or micro SD card would allow the data to be transferred to a computer. Even if the hand controller was connected to the pump housing via a wire, it could be disengaged from the wire and carried easily to a computer. The hand controller can be provided with a USB port so that it could be connected to a computer (such as a laptop, tablet or Desktop). The data could be downloaded into the computer and formatted into a template for easier reading by the user. Alternatively the information could be transmitted (wirelessly or through the internet) to a support service that would format the data into a readable template, interpret the data (either automated using a computer, or manually), and contact the user (via phone, internet, etc.) to discuss the findings and assist the user to understand the results and how they reflect the quality (or lack of quality) sleep they recorded.

The type of information they would convey would include but not limited to the following: the number of hours of sleep each night for the last 30 days (time period may vary depending on the parameters set); average number of hours of sleep for the last 30 days; the total hours of snoring each night and the average for the last 30 days; the total hours of restless leg syndrome and the average for the last 30 days; the time it took to fall asleep each night and the average for the last 30 days; the total number of times the individual left the bed during the night (e.g., to go to the bathroom); the length of time away from the mattress and the amount of time it took to fall back asleep. These could be also expressed as averages per night.

The total number of sleep hours at various Support Index levels, the total number of movements at each of those Support Index levels, the average number of movements per hour at each Support Index level, can all be tracked and some or all of this data can be used to make a recommended Support Index, based on minimizing one of more of these measures, and/or based on some weighting factor or factors.

The amount of Alpha, Beta, Theta and Delta sleep obtained each night and an average for the period can be estimated based upon the historical scientific data on the length of the sleep stages based upon uninterrupted and interrupted sleep cycles.

Where temperature sensors are provided, bed temperature at regular periods (e.g., for each quarter hour) each night the individual slept on the mattress can be recorded. The number of movements per hour per temperature could then be calculated, to determine the individual's optimum sleeping temperature.

A photo sensor could also be added to the hand control to determine the ambient light level (e.g., in lumens) in the room. It is a popular hypothesis that higher lumen levels will cause an individual to wake up. The number of movements could also be tracked based on the lumen levels. It could then be determined if the lumen levels impact the quality of sleep as determined by the average number of movements per lumen level.

Based upon the data collected and analyzed, various recommendations could be communicated to the user. This communication could be done via the hand control based upon a wireless transmission from a cloud server. It could also be communicated via a telephone conversation to translate the results to the user. It could also be communicated via email with a spreadsheet showing all the data on a daily basis, the cumulative averages and the recommendations. The recommendations may include but are not limited to the following:

Sleep Temperature

Studies show that movements increase and sleep quality decreases when skin temperature is above 90 degrees Fahrenheit, so recommendations of one or more of the following could be provided: increase or decrease the temperature of the room; addition or subtraction a heating blanket; addition a mattress pad; change the pillow (assuming that may have an impact of the sleeping temperature of the individual) to one that has heat absorbing/dispersing capabilities; a change of mattress or bedding (e.g., one with phase change technology (for example using micro-capsules containing paraffin embedded in the fabric. These will liquefy when subjected to sustained heat (e.g., from the sleeper's body, absorbing the heat.

The hand controller could also be provided with the ability to send a signal to turn on a ceiling fan or to engage the HVAC system in the house to lower or increase the temperature in the bedroom.

Snoring

If snoring or stilted breathing is detected, the system could recommend an adjustable base to adjust the level of the mattress to increase air flow while breathing.

Based upon the intensity, duration, number of movements per night, referral to a sleep clinic or doctor to review if a CPAP machine may be appropriate.

Sleep Problems

Studies show the optimum amount of time to fall asleep is within the 10 to 15 minute range. Those that fall asleep in 5 minutes or less are generally sleep deprived. Those that fall asleep after more than 20 minutes may have other obstacles preventing them from going to sleep (too much caffeine, difficulty relaxing, pain issues etc.).

A questionnaire could also be used to gather information (via email, phone, or directly to the hand control) asking about the individual's sleep habits/protocol/ritual/preparations/environment/exercise/diet etc. This information could reveal the cause of the difficulty in getting to sleep and/or their exhaustion level that causes them to immediately fall asleep, that could be used to make or modify recommendations resulting from the data collected and stored.

These variables could be input into the software system and recommendations made to the consumer regarding potential remediation techniques or products that can assist the individual to obtain a more restful efficient sleep.

The system records the total amount of time spent in the bed and can differentiate breathing during sleep vs. being awake so the total sleep obtain for each night can be verified. If the individual reaches a sleep state too quickly, a recommendation may be to go to bed earlier and get more hours of sleep.

The system could indicate the number of movements per hour per Support Index by temperature reading. Using this information the system, an optimum temperature and Support Index setting could be recommended. The number of adjustments and the degree of inclination provided by a power base system (if provided) are indicated by the software output. This information is also compared to the movements and snoring at each inclination.

The data may indicate that the individual may optimize their sleep by starting out their sleep in a particular position (e.g., a slightly inclined position) to prevent snoring from occurring. The data may also suggest a change in the programming of the power base pre-set positions. The interpreted data would indicate which positions produced the fewest movements and the least amount of snoring.

This system may also be used by a third party who would be authorized by the user to obtain the information. For example if an adult age 50 purchased the mattress system for their aging parent(s) in their 80's who may live in another state in a retirement home or at their residence, it could provide valuable information about their care and well-being. For example, if it was noted that his/her aging father was getting up 3 or 4 times a night for only a few minutes, (presumably to go to the bathroom) it might be recommended that he see a Urologist about a prostate issue. Studies have also shown that dementia and/general disorientation may linked to sleep deprivation it would be important to have information on how many hours/per night the individual is actually sleeping. This data may also be sent directly to the nurses/doctors of the care facility to assist in the individual's care and treatment. Chronic Sleep deprivation has been linked to many health issues such as weight gain, memory loss, dementia, serotonin levels, depression, mood swings, and many diseases such as cancer. Monitoring and improving sleep quality can have a significant impact on our nation's health. This system is relatively inexpensive and can be used in home or at a health institution such as a hospital or Rest Home.

An individual's weight, sleep environment, health, sleep habits, lifestyle, allergies, bedding may vary over time and be impact the individual's quality of sleep to a greater or lesser degree. This system can have a long term connection to the user to communicate their current sleep efficiency and to recommend alternatives that will assist them to improve their sleep. The system can constantly feed information to a central server that can process the data and provide relevant feedback to the individual and/or provide the information to a Sleep Professional or someone in the medical field to review the information and provide input and recommendations to the individual. This bi-directional feedback system is meant to provide regular updates of the quality of an individual's sleep and suggestions for improvement alternatives.

The logic of other functions that underlie the measuring, displaying, and adjusting of pressure are illustrated in the Figures.

Like controller 100, controller 200 can be implemented as a wired device connected to the pressure system via a wire (not shown). Alternatively, the controller 200 can be implemented as a wireless device, with the controller wireless connected to the pressure system, for example by with a Bluetooth, Wi-Fi, ZigBee, x10, Z-Wave, radio frequency (RF), infrared or other wireless connection. The controller may even be implemented as a program (app) running on a smart phone or a tablet. In the case of a smart phone or tablet, the controls may be virtual buttons, sliders, or other types of control elements displayed on the screen of the device, which can be operated by the user. Similarly the display portion 204 of the controller 200 can be implemented by a plurality of lit, partially lit, or unlit areas on the screen of the device. Unactivated elements may be completely blank or they may be outlined or partially lit to give the user a sense of how many elements are activated and how many elements are not activated.

As the pressure in the chambers is changed, the display 204, which is preferably constructed according to the principles of this invention, for example display 50 is updated. The display 204 provides detailed feedback information to the user so that the user can better control the pressure in the chambers for maximum comfort. The display 204 provides a numerical display of the current pressure in each chamber though indicators 272, which display a numerical value for the current region or comfort index. The display 204 also provides a graphical display of the total current pressure in each chamber (through the arrays 264 of elements 266) so that the users can better visualize the pressure value and better visually interpret the pressure differences between the chambers. The display 204 also displays both a numerical and verbal cue to the level of firmness corresponding to the current pressure, through indicators 274 and 276 and a visual cue through the color coordination of the indicators 272, 274, and 276.

An air mattress pump and control unit in accordance with a preferred embodiment of this invention is indicated generally as 1000 in FIGS. 20-22. The pump and control unit 1000 comprises a base 1002 and a housing 1004. Although the housing 1004 could take any form, the housing is preferably smooth and rounded so that is unobtrusive, and does not present sharp edges to catch carpeting or bedding.

The pump and control unit 1000 preferably has a recessed rear end 1006, from which a plurality of ports 1008 extend. These ports 1008 communicate with the outlet of an air pump 1010 inside the pump and control unit 1000 via a valved manifold (not shown), and can be connected to the chambers of an air mattress. As shown in FIG. 21, there are four ports 1008, two for connecting to fluid chambers on a first side of the air mattress, and two for connecting to a second side of the air mattress. Each side of the air mattress can therefore have at least two chambers, and in the preferred embodiment at least three chambers, where two of the chambers (for example a head and a foot chamber) are in fluid communication.

There is preferably a recess 1012 in the side of the base 1002, in which there are two connector sockets 1014 (for example USB sockets) for making a connection between a control circuit board inside the pump and control unit 1000, and hand held controllers (e.g., the controllers 100 or 200 described above, or the controllers 1020A or 1020B described below) for operating the air mattress. Of course instead of a wired connection, the hand held controllers could be wirelessly connected to the pump and control unit 1000. The recess 1010 preferably also contains a connector 1012 for connecting to a power supply to provide power to the pump and control unit 1000.

There is preferably at least one light 1018 on the pump and control unit 1000. The light can be on the exterior of the housing 1004, or in can be disposed inside the housing, adjacent a transparent or translucent portion of the housing.

One or more controllers 1020 can be coupled to the pump and control unit 1000, either by wire, for example using the sockets 1014, or wirelessly, as described above with respect to controllers 100 and 200. A first control 1020A is shown in FIG. 23. The control 1020A is adapted for operating a mattress with a single chamber. Two such controllers 1020A would typically be used to control double mattress (one with a single chamber on each side), although a single control with a selector switch could alternatively be provided. The control 1020A has a display 1022. The display 1022 includes a numerical SI indicator 1024, a graphic SI indicator 1026, and a comfort index indicator 1028. The display preferably also includes an ISI indicator 1030, a memory indicator 1032, a light indicator 1034, and an auto-fill indicator 1036. The control 1020A also has a plurality of control buttons. The control buttons can include up and down buttons 1038 and 1042 for increasing and decreasing the pressure (the Support Index), an auto-fill button 1046 (similar to auto-fill buttons 114 and 214 described above), a movement recall button 1048 (similar to movement recall button 220 described above), a Comfort Index button 1050 (similar to Comfort Index button 222 described above), an Ideal Support Index button 1052 (similar to Ideal Support Index button 224 described above), a memory button 1054 (similar to memory button 114 and 214 described above), and a light button 1056 (similarly to light button 218 described above).

A second controller 1020B is shown in FIG. 24, and is similar to controller 1020A described above. The controller 1020B is adapted for a multiple chamber air mattress (i.e., two or more chambers). Multiple chamber mattresses typically comprise three chambers, a head, a lumbar, and a foot chamber, but the head and foot chambers are typically connected together. Two such controllers 1020B would typically be used to control double mattress (one with three chambers on each chamber side), although a single control with a selector switch could alternatively be provided. The control 1020B has a display 1022. The display 1022 includes numerical SI indicator 1024A, 1024B, and 1024C, a graphic SI indicator 1026, and a comfort index indicator 1028. The display preferably also includes an ISI indicator 1030, a memory indicator 1032, a light indicator 1034, and an Auto-Fill indicator 1036. The control 1020A also has a plurality of control buttons. The control buttons can include up and down buttons 1038 and 1040 and 1042 for increasing and decreasing the pressure (the Support Index), an auto-fill button 1046 (similar to auto-fill buttons 114 and 214 described above), a movement recall button 1048 (similar to movement recall button 220 described above), a Comfort Index button 1050 (similar to Comfort Index button 222 described above), an Ideal Support Index button 1052 (similar to Ideal Support Index button 224 described above), a memory button 1054 (similar to memory button 114 and 214 described above), and a light button 1056 (similarly to light button 218 described above).

The controllers 1020A, 1020B can include a removable memory device, such as a USB device or a SD or micro SD card, or any other suitable storage device. This allows data collected from the use of the air mattress to be downloaded, for processing as described above. Alternatively, or additionally, the controls can be disconnected from the pump and control unit 1000, and connected to a computer to download data from a memory on the controller, for processing as described above.

One possible control algorithm for the pump and control unit 1000 is shown in FIG. 25. The pump and control unit 1000 includes a computer processor, memory, and other elements to execute the algorithms described, or other similar algorithms. In this preferred embodiment the pump and control unit 1000 executes a sample loop 1100 forty times per second, a second loop 1200 every second, a minute loop 1300 every minute, and an hour loop 1400 every hour.

Figure 9A:
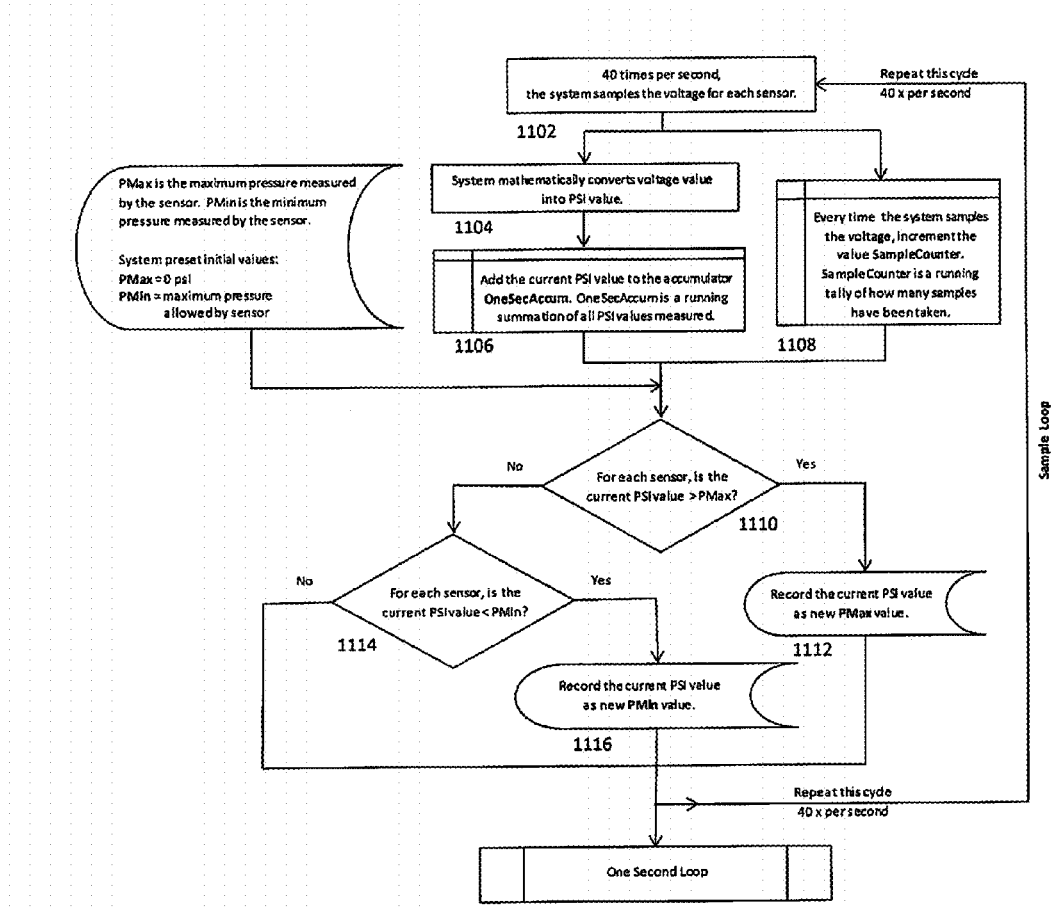
FIG. 9A-9D are flow charts of the logic for the pressure sampling by the sensors for use with the displays and controllers of the various embodiments of this invention.

One possible control logic for the sample loop 1100 is shown in FIG. 9A. At 1102 the system samples the voltage of each pressure sensor in the system. Typically there is a pressure sensor for each separate chamber, although a single sensor that is switched could be used. At 1104 the system converts the voltage values at each sensor into pressure values. At 1106 the pressure value is added to an accumulator OneSecAccum, and at 1108 the SampleCounter is incremented. At 1110, the pressure value for each sensor is compared with the maximum pressure value PMax. If the pressure is greater than the current PMax, then at 1112 the PMax is set to the current pressure. If the current pressure is less than PMax, then at 1114 the current pressure is compared with the minimum pressure value PMin. If the current pressure is less than the current PMin, then at 1116 the PMin is set to the current pressure. The loop 1110 repeats 40 times per second.

Figure 9B:
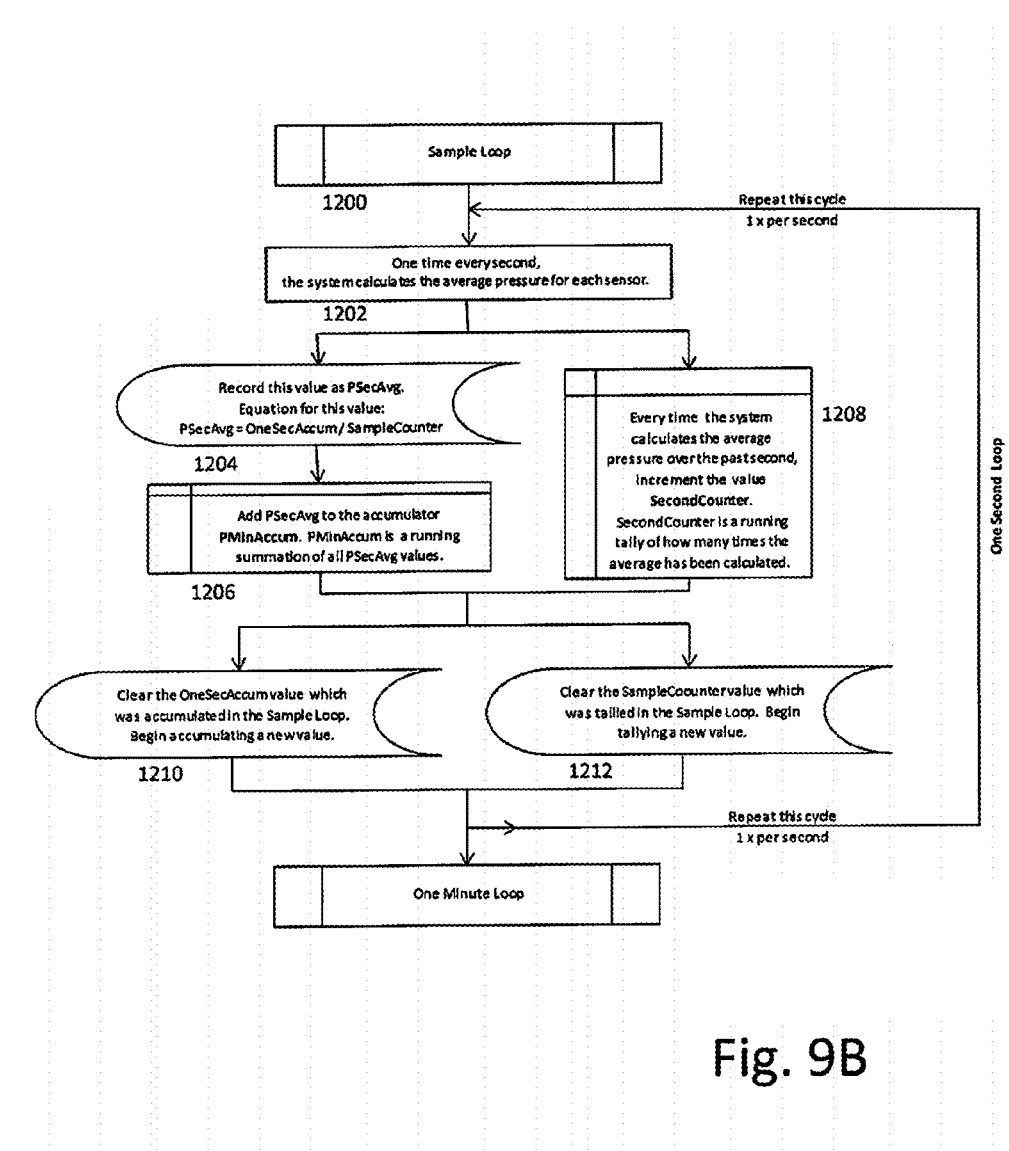

One possible control logic for the one second loop 1200 is shown in FIG. 9B. At 1202, the control initiates a calculation of the average pressure over the last second PSecAvg using the data collected during the sample loop 1100. At 1204, the control calculates the PSecAvg by dividing the accumulated measurements over 40 measurements, i.e., OneSecAccum divided by the value of the SampleCounter. At 1206, the control adds the calculated PSecAvg to the accumulator PMinAccum, and at 1208 increments the value of SecondCounter. At 1210 the OneSecAcuum value accumulated in the sample loop 1100 is cleared, and at 1212 the SampleCounter value tallied in the sample loop 1100 are cleared.

Figure 9C:
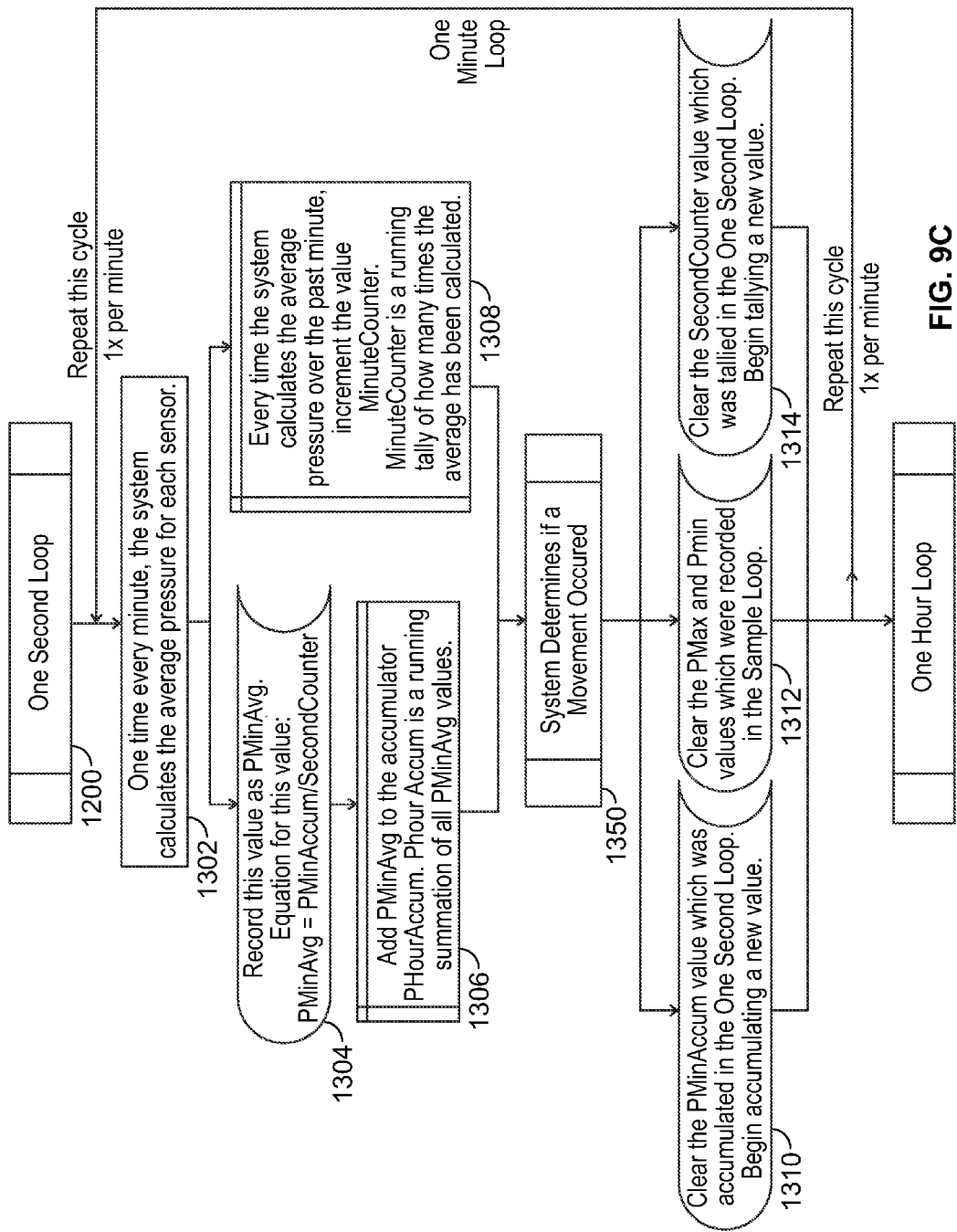
Figure 10:
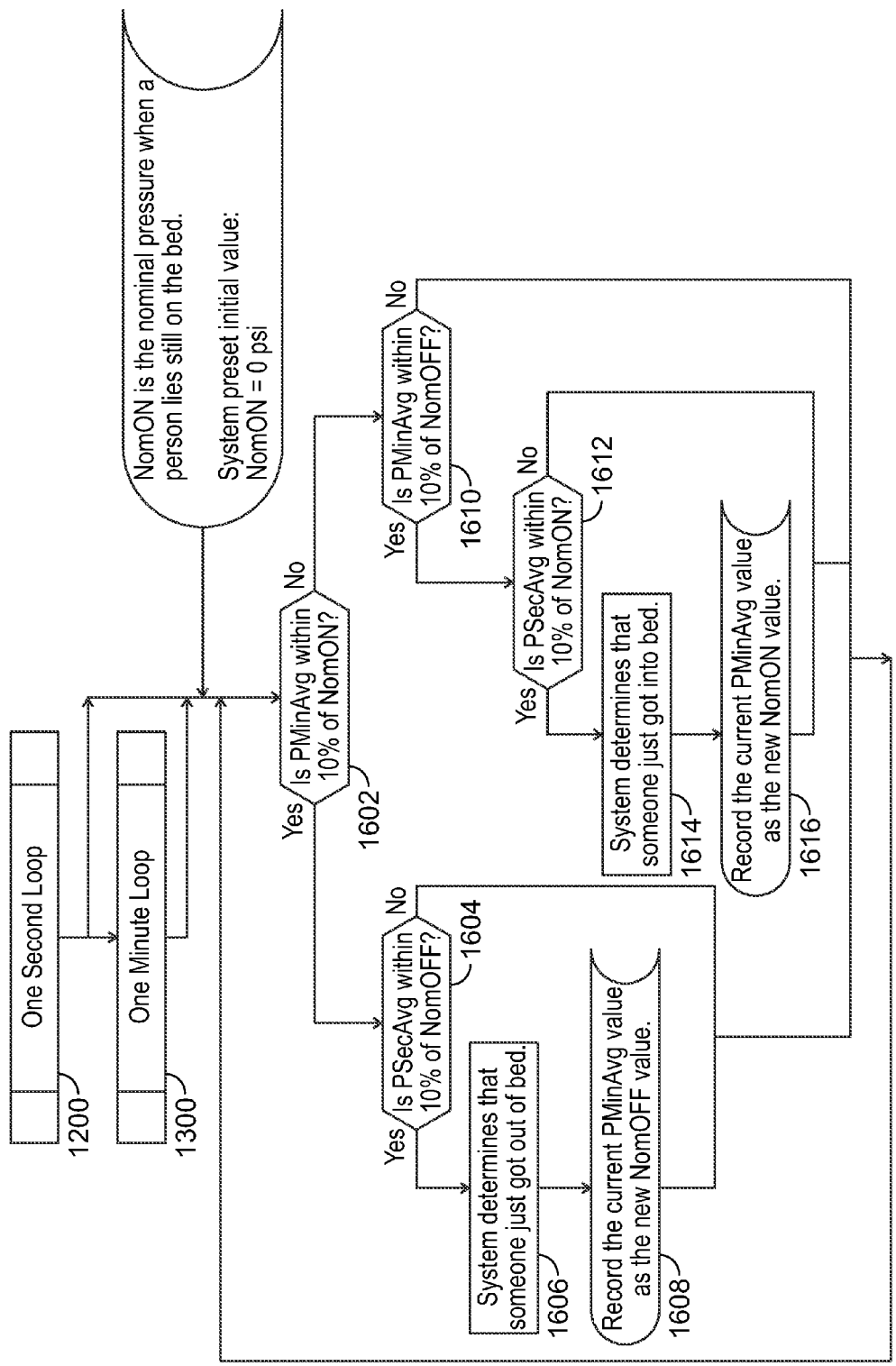
FIG. 10 is a flow chart of the logic for determining when someone gets into or out of the bed for use with the displays and controllers of the various embodiments of this invention.

One possible control logic for the one minute loop 1300 is shown in FIG. 9C. At 1302, once per minute the control calculates the average pressure for each sensor. At 1304, the average is recorded as PMinAvg by dividing PMinAccum by the SecondCounter. At 1306 PMinAvg is added to the accumulator PHourAccum, which is a running summation of all PMinAvg values. At 1308 the control increments the value of MinuteCounter. Also during the one minute loop 1300, at 1350 the control determines whether a movement has occurred (the possible logic for this determination is shown in FIG. 10, and described above). At 1310 the control clears the PMinAccum accumulated during the one second loop. At 1312 the control clears the PMax and PMin values recorded in the sample loop 1100. At 1314 the control clears the SecondCounter accumulated in the one second loop 1200.

Figure 9D:
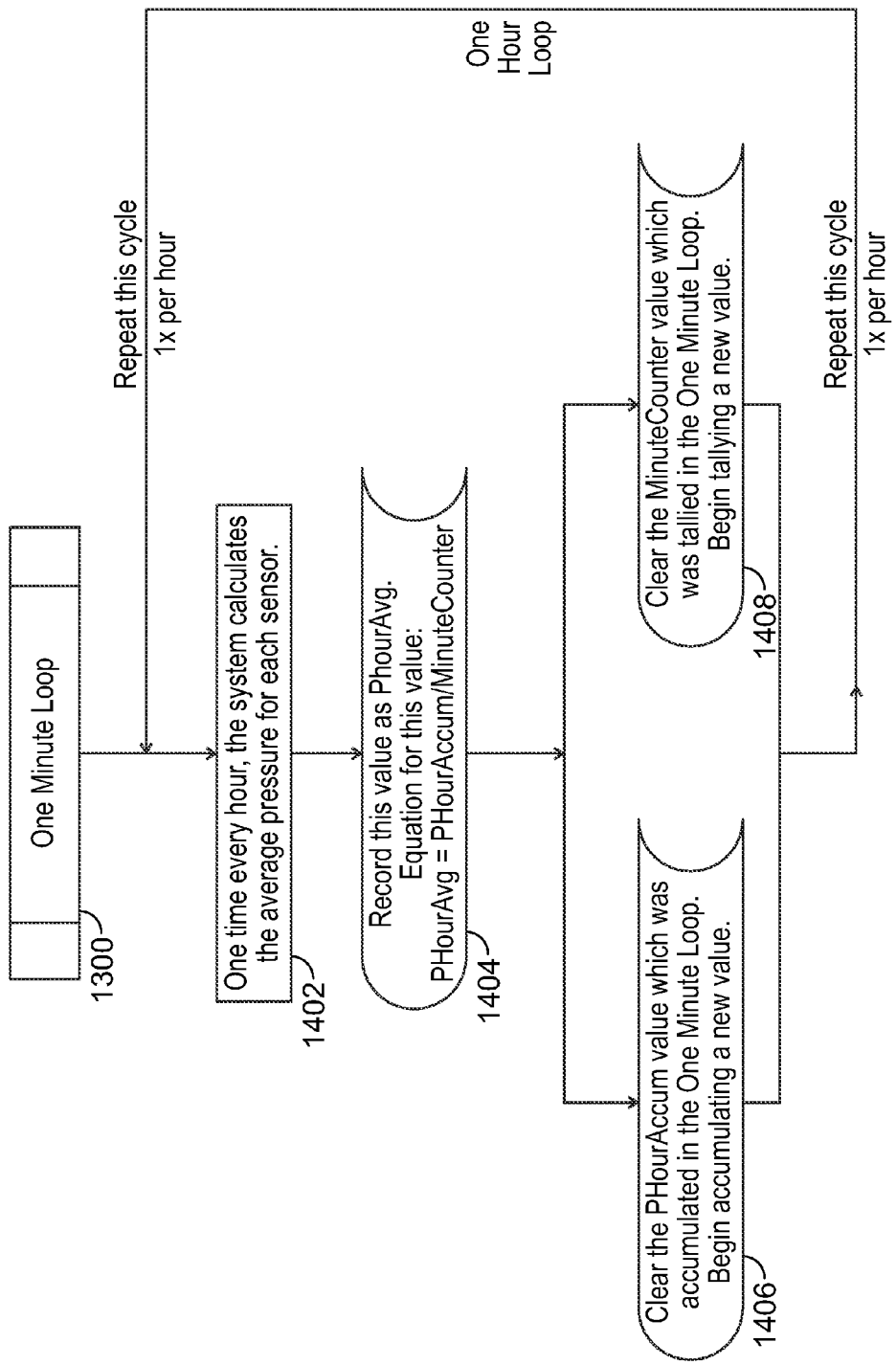

One possible control logic for the one hour loop 1400 is shown in FIG. 9D. At 1402 the control calculates the average pressure for each sensor once per hour. At 1404 the average PHourAvg determined by dividing the PHourAccum by the MinuteCounter is recorded. At 1406 the control clears the PHourAccum value that was accumulated in the one minute loop 1300. At 1408 the MinuteCounter that was tallied in the minute loop 1300 is cleared.

As indicated in FIG. 25, the control checks whether someone has gotten on or off the mattress. One possible control logic for this is shown in FIG. 10. At 1602 the control determines whether the PMinAvg is within 10% of NomON, the nominal pressure when a person is lying still on the bed. While the number 10% is used in step 1602, some other variance from the NomON could be used. If the PMinAvg is within 10% of NomON, then at 1604 the control determines whether PSecAvg is within 10% of NomOFF, the nominal pressure when no one is lying on the bed. If the value of PSecAvg is within 10% of NomOFF, then at 1606 the control determines that someone just got out of bed. At 1608 the current PMinAvg value becomes the new NomOFF value. If PMinAvg is not within 10% of NomON, then at 1610 the control determines whether PMinAvg is within 10% of NomOFF. If the value of PMinAvg is within 10% of NomOFF, then at 1612 the control determines whether PSecAvg is within 10% of NomON. If PSecAvg is within 10% of NomON, then at 1614 the control determines that someone just got into bed. At 1616 the current value of PMinAvg becomes the new NomON value.

Figure 11:
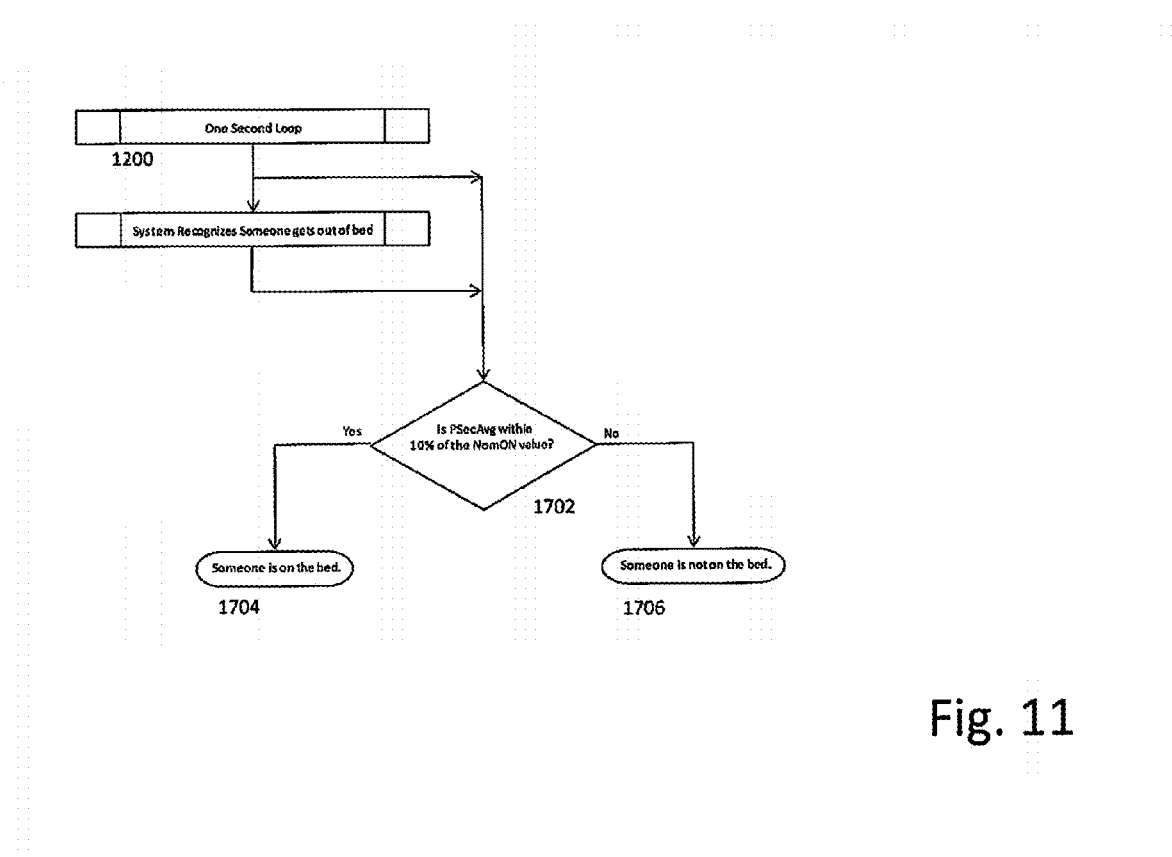
FIG. 11 is a flow chart of the logic for determining when someone is on the bed for use with the displays and controllers of the various embodiments of this invention.

As indicated in FIG. 25, the control also checks whether someone is on the bed at 1700 as part of the sample loop 1100. As shown in FIG. 11, at 1702, the control determines whether PSecAvg is within 10% of the NomON value. If PSecAvg is within 10% of the NomON, then at 1704, the control determines that someone is on the bed. If PSecAvg is not within 10% of the NomON, then at 1706, the control determines that someone is not on the bed.

Figure 12:
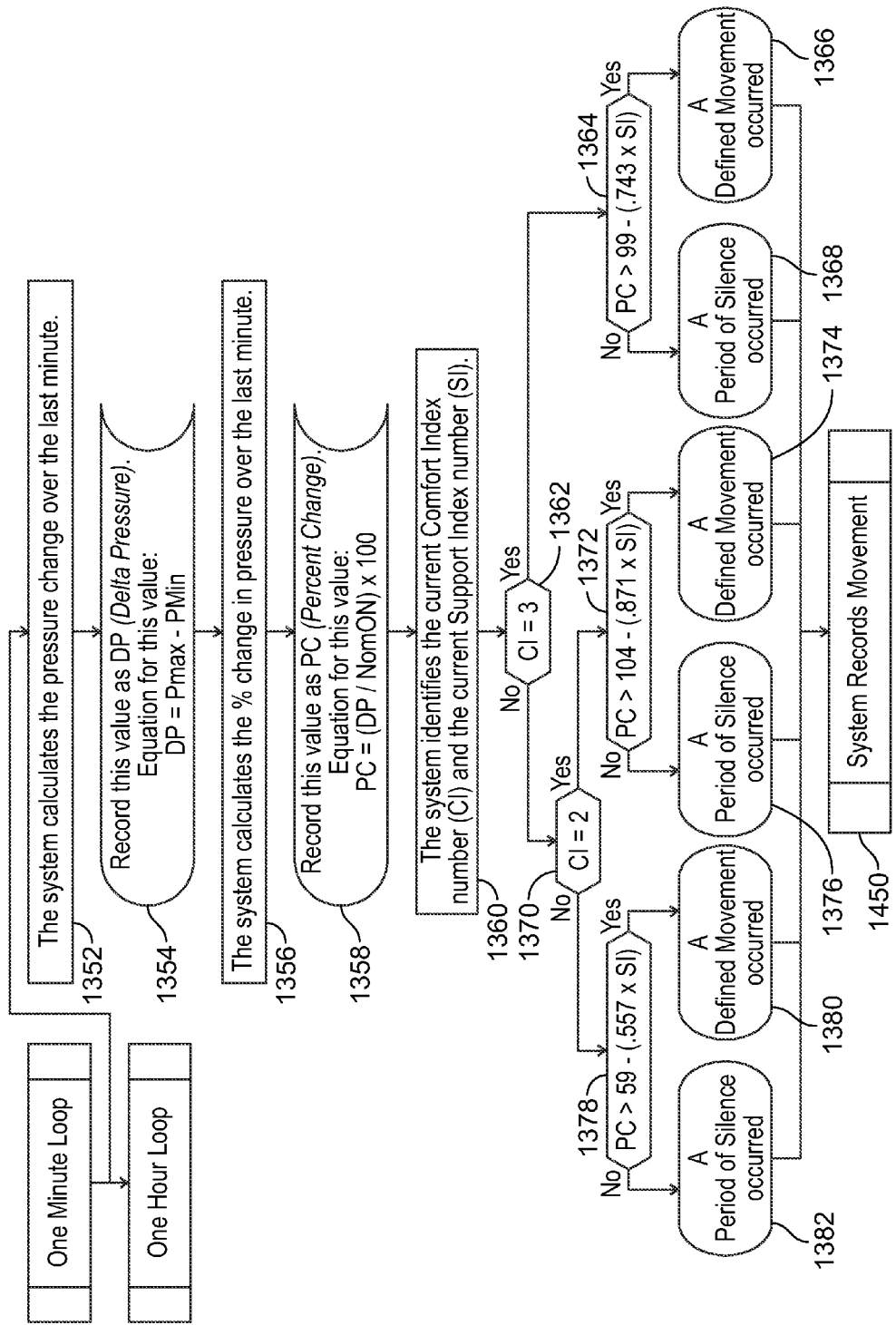
FIG. 12 is a flow chart of the logic for determining when movement occurs on the bed for use with the displays and controllers of the various embodiments of this invention.

As indicated in FIG. 25, at 1350, the control determines whether a user has moved on the mattress. One possible control logic for this is shown in FIG. 12. At 1352, the control calculates the pressure change over the past minute. At 1354, the control records DP (the pressure change) as the difference between PMax and PMin. At 1356, the control determines the percent pressure change over the past minute. At 1358, the control records PC (the percent change in pressure) as the pressure change PC divided by NomON, multiplied by 100. At 1360, the control identifies the current Comfort Index number CI, and the current support index number SI.

At 1362 the control determines whether the CI is at level 3. If CI is at 3, then at 1364, the control determines whether the percent pressure change is sufficient to qualify as a movement for the given SI. If so, then at 1366 the system counts a movement. If not, then at 1368 the system counts a period of silence. If CI is not at 3, then at 1370 the control determines whether the CI is at level 2. If so, then at 1372 the control determines whether the percent pressure change is sufficient to qualify as a movement for the given SI. If so, then at 1374 the system counts a movement. If not, then at 1376 the system counts a period of silence. If the CI is not at 2, then at 1378, the control determines whether the percent pressure change is sufficient to qualify as a movement for the given SI. If so, then at 1380 the system counts a movement. If not, then at 1382 the system counts a period of silence.

The definition of movement preferably depends on the CI (Comfort Index) value selected by the user, and the SI (support index) value selected by the user. FIG. 26 illustrates one way the definition of "movement" can vary with Support Index and the Comfort Index. Movement can be conveniently defined as a percentage change in pressure. As shown in FIG. 26, the pressure change that constitutes movement can vary (preferably decrease) with the SI setting, for a given CI setting. As also shown in FIG. 26, the pressure change that constitutes movement can vary (preferably increase) with the CI setting, for a given SI setting. The relationship between the percentage pressure change that constitutes movement and SI setting, is not necessarily linear, and can vary with the SI setting. For example, as shown in FIG. 26, the percentage pressure change that defines movement varies linearly with SI setting for SI settings between 30 and 50, various linearly with SI setting (but at a different rate) for SI settings between 50 and 70, and varies linearly with SI setting (but at a different rate) for SI settings between 70 and 100. The rate also depends upon for each of these ranges can also vary with the CI. The pressure change that defines movement can be determined experimentally by observing persons sleeping on the mattress, statistically from the pressure changes observed at different SI and CI levels. Of course the definition of movement for a given system could vary from the relationships shown in FIG. 26.

Figure 13:
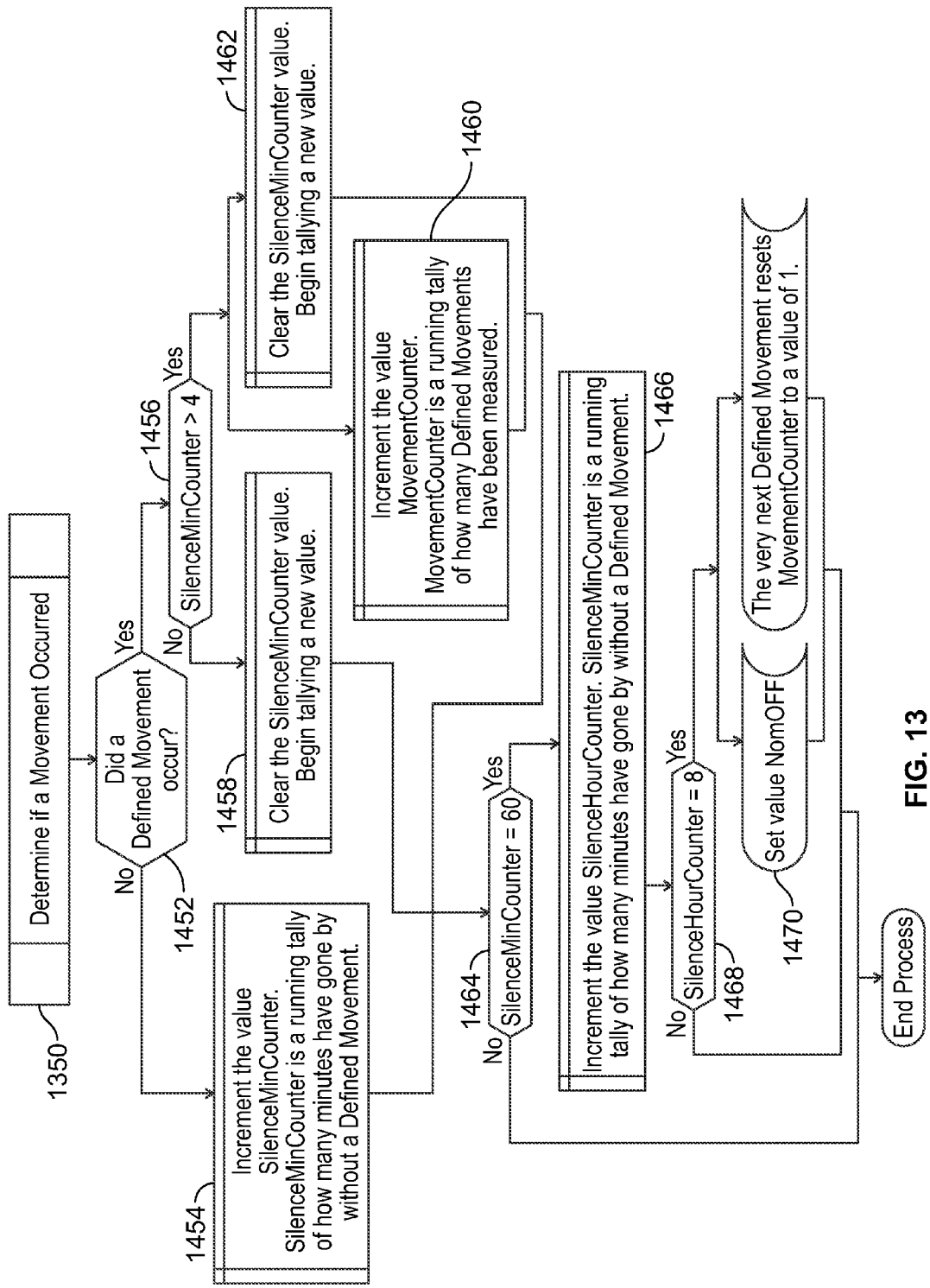
FIG. 13 is a flow chart of the logic for recording movement on the bed for use with the displays and controllers of the various embodiments of this invention.

As indicated in FIG. 25, at 1450, after the control determines whether a user has moved on the mattress, the movement is recorded. One possible control logic for this is shown in FIG. 13. At 1452, the control determines whether a movement has in fact occurred. If a movement has not occurred, at 1454 the value of SilenceMinCounter, a running tally of minutes without a defined movement, is increased. If a movement has occurred, then at 1456 the control determines whether the silence counter SilenceMinCounter is greater than 4 (minutes). If not, then at 1458, SilenceMinCounter is reset to zero. If SilenceMinCounter is greater than 4, then at 1460 the MovementCounter is incremented, and at 1462 the SilenceMinCounter is reset to zero. The 4 minute spacing implemented at 1456 requires that there be a defined period of non-movement between movement events. Movements that are not separated by some preselected period (in the preferred embodiment four minutes) are treated as part of the same movement, and not a separate movement event. The period of four minutes was empirically chosen, but some other period of time could be selected.

At 1464, the control determines whether the SilenceMinCounter equals 60. If so, then at 1466 the SilenceHourCounter is incremented. At 1468 the control determines whether SetHourCounter is 8. If so, at 1470 the value of NomOff is set, so that the next defined movement resets the movement counter to a value of one.

The first or second controllers 1020A and 1020B allow the user to modify the operation of the pump and control unit 1000. The controller buttons 1038 and 1042 on controller 1020A allow the user to increase and decrease the pressure in the single chamber of the mattress connected to the pump and control unit 1000. The controller buttons 1038, 1040, 1042, and 1044 on controller 1020B allow the user to increase and decrease the pressure in the head and foot chambers of the mattress (which are preferably connected), and in the lumbar chamber of the mattress.

The other buttons on the controllers 1020A and 1020B provide additional functions.

Auto-Fill Button

The Auto-Fill button 1046 (like Auto-Fill buttons 114 and 213 described above) operates the control to cause the pump in the pump and control unit 1000 to fill the mattress chambers to either a predetermined factory setting, or a previously stored user setting (using the memory button 1054).

Movement Recall Button

Figure 17:
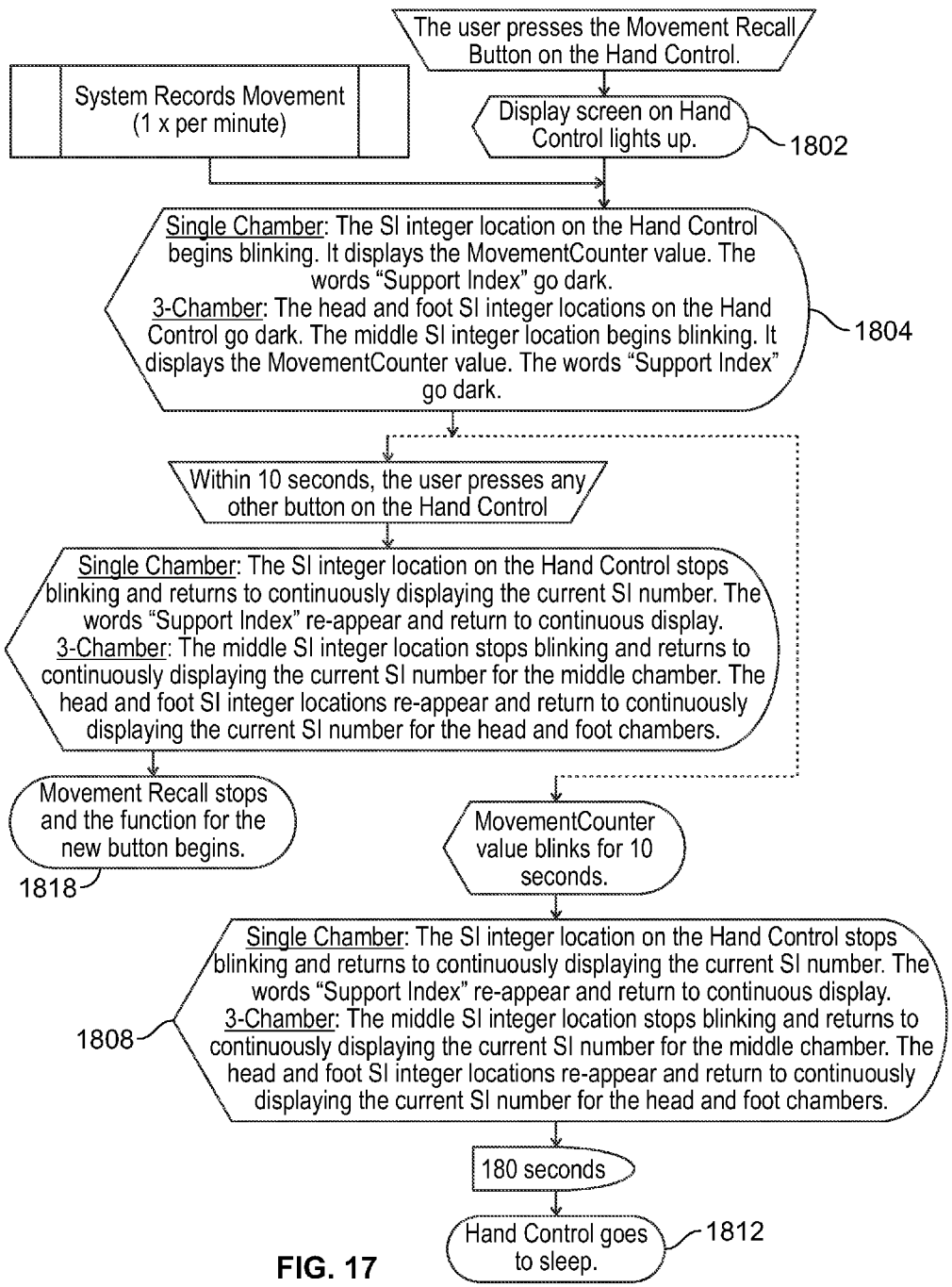
FIG. 17 is a flow chart of the movement recall function for use with the displays and controllers of the various embodiments of this invention.

A possible control logic for the operation of the Movement Recall Button 1048 is shown in FIG. 17. Upon operation of the Movement Recall button 1048, at 1802 the display 1022 on the control 1020A or 1020B lights up. At 1804, for control 1020A the support index indicator 1024 begins blinking, and it displays the current value of the MovementCounter. The label "Support Index" on the displays 1022 goes dark. For control 1020B, the support index indicators 1024A and 1024C go dark. The indicator 1024B begins blinking, and it displays the current value of the MovementCounter. The label "Support Index" on the display 1022 goes dark. After a predetermined period of time, such as ten seconds, for control 1020A at 1808 the support index indicator 1024 stops blinking and begins continuously displaying the current Support Index value. The label "Support Index" on the display 1022 lights up. For control 1020B at 1808 the support index indicator 1024B stops blinking and indicators 1024A, 1024B, and 1024C begin continuously displaying the current Support Index value. The label "Support Index" on the display 1022 lights up. After a predetermined period, for example 180 seconds, at 1812 the controls 1020A or 1020B go to a sleep state. If during the period (ten seconds in the preferred embodiment) that the displays 1022 of controls 1020A or 1020B are displaying the MovementCounter value, any other button is pressed, then at 1818 the Movement Recall function ceases, and the function of the newly pressed button begins.

Comfort Index Button

Figure 15:
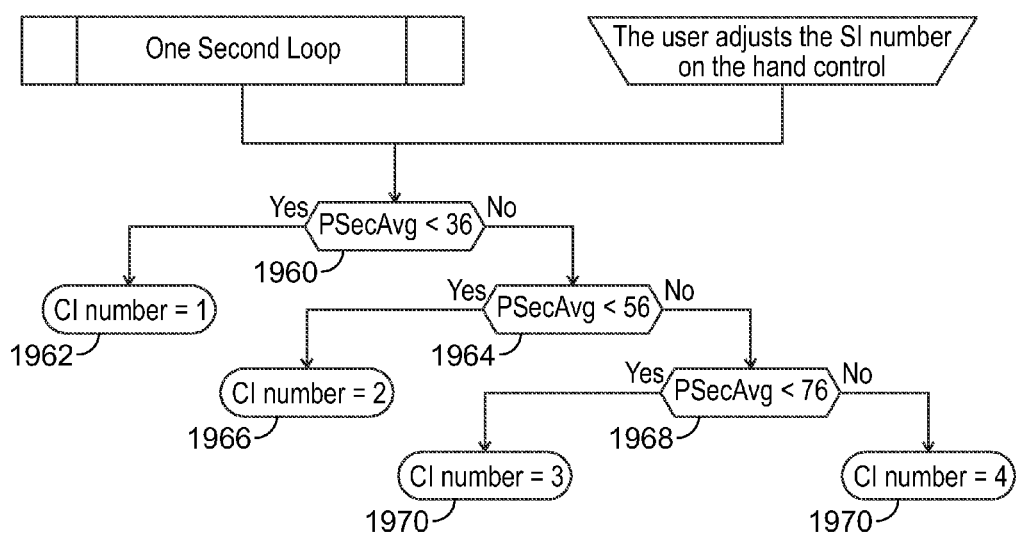
FIG. 15 is a flow chart of the logic for determining the comfort index for use with the displays and controllers of the various embodiments of this invention

A possible control logic for the operation of the Comfort Index Button 1050 is shown in FIG. 18. As shown in FIG. 18A upon operation of the Comfort Index Button 1050, at 1902 the display 1022 on the control 1020A or 1020B lights up. At 1904 the control determines whether someone is on the bed (for example as shown and described above with respect to FIG. 11). At 1906, if someone is in the bed, then at 1908 the system calculates a new Comfort Index value, and at 1910 the control displays the new comfort index value on the display 1022 of the controller 1020A, 1020B. A method of calculating a new Comfort Index is shown in FIG. 15, and described below. After a predetermined period, for example 180 seconds, at 1914 the controls 1020A, 1020B go to a sleep state.

If at 1906 someone is not on the bed, then at 1916 the control causes the bed to inflate to a predetermined Support Index value, for example 50. At 1918 the PSecAvg value determined in the One Second Loop 1200, which is the pressure inside the bed at the predetermined Support Index value is recorded as the value P1. At 1920, after the user lies on the bed, at 1922, the PSecAvg value calculated in the One Second Loop 1200, which is the pressure inside the bed when a user is lying on the bed, is recorded as value P2. At 1924 the difference between P1 and P2 is calculated.

Figure 14:
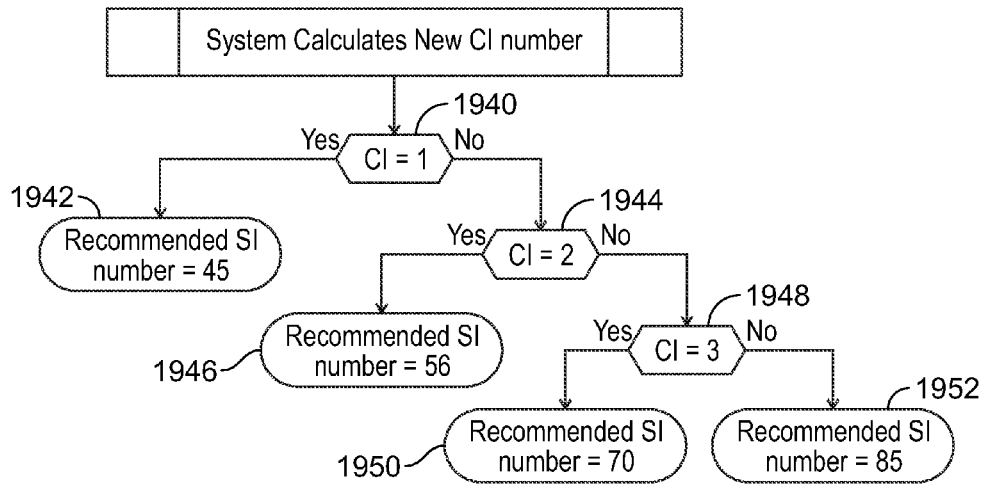
FIG. 14 is a flow chart of the logic for determining a recommended support index for use with the displays and controllers of the various embodiments of this invention.

Referring now to FIG. 18B, at 1926 the control calculates a recommended Support Index value. (This recommended Support Index is only one possible recommended mode of operation, and other recommendations for operation instead of or in addition to the Support Index could be provided.). One method of making this calculation is shown in FIG. 14, and described below. At 1926 the controller displays the recommended Support Index value. For control 1020A, the Support Index display 1024 begins blinking, showing the recommended Support Index value. For control 1020B, the Support Index displays 1024A and 1024C go dark, and the display 1024B begins blinking with the recommended support index number. At 1928, after the recommended Support Index value blinks for a predetermined time, such as ten seconds, the display 1022 of controllers 1020A, 1020B return to normal. At the same time, at 1930, the control calculates a new Comfort Index value. For both controllers 1020A, 1020B, the Control Index display 1028 begins blinking, showing the recommended Comfort Index value. In addition, the blinking display can alternate between an H or an L depending upon whether the recommended Comfort Index value is higher or lower. At 1932, after the recommended comfort index value blinks for a predetermined time, such as ten seconds, the display 1022 of either control 1020A or 1020B returns to normal. After a predetermined period, for example 180 seconds, at 1938 the controls 1020A or 1020B go to a sleep state.

The method of calculating a recommended support index used in this method is shown in FIG. 14. As shown in FIG. 14, at 1940, the control determines whether the current comfort index is set to one. If it is, then at 1942 the control recommends a support index of a particular value, for example 45. If the comfort index is not set at one, then at 1944 the control determines whether the current comfort index is set to two. If it is, then at 1946, the control recommends a support index of a particular value, for example 56. If the comfort index is not set at two, then at 1948 the control determines whether the current comfort index is set to three. If it is, then at 1950, the control recommends a support index of a particular value, for example 70, if it is not, then at 1952, the control recommends a support index of a particular value, for example 85.

The method of calculating a recommended comfort index used in this method is shown in FIG. 15. As shown in FIG. 15, at 1960 the control determines whether the PSecAvg is less than a threshold level for example 36. (These pressure levels can be chosen empirically). If PSecAvg is less than the predetermined threshold level, then at 1962 the control sets the CI number as 1. If PSecAvg is not less than the predetermined threshold level, then at 1964 the control determines whether the PSecAvg is less than a threshold level for example 56. If PSecAvg is less than the predetermined threshold level, then at 1966 the control sets the CI number as 2. If PSecAvg is not less than the predetermined threshold level, then at 1968 the control determines whether the PSecAvg is less than a threshold level for example 76. If PSecAvg is not less than the predetermined threshold level, then at 1970 the control sets the CI number as 3.

PSecAvg is less than the predetermined threshold level, then at 1964 the control determines whether the PSecAvg is less than a threshold level for example 56.

Ideal Support Index Button

A possible control logic for the operation of the Ideal Support Index Button 1052 is shown in FIG. 19. As shown in FIG. 19A upon operation of the Ideal Support Index Button 1052, at 2002 the display 1022 on the control 1020A or 1020B lights up. At 2004 if the user holds the Ideal Support Index Button 1052 for more than 3 seconds, then at 2006, the control determines whether the Ideal Support Index mode is on. If the Ideal Support Index mode is on, then at 2008 the Ideal Support Index mode is toggled off. At 2010 the Ideal Support Indicator on the display 1022 goes dark, and at 2013 the control stops tracking the support index number with each defined user movement. After a predetermined period, for example 180 seconds, at 2014 the controls 1020A or 1020B go to a sleep state. Referring now to FIG. 19B, at 2016, if the user presses the Movement Recall button 1048, then at 2018 for control 1020A the support index indicator 1024 begins blinking, and it displays the current value of the MovementCounter. The label "support index" on the display goes dark. For control 1020B, the support index indicators 1024A and 1024C go dark. The indicator 1024B begins blinking, and it displays the current value of the MovementCounter. The label "support index" on the display goes dark. At 2020 the control determines whether another button is pressed within a predetermined time, for example ten seconds, and if so at 2022 then at 2022 the Movement Recall function ceases, and at 2024 the function for the newly pressed button begins.

If another button is not pressed within the predetermined time, then at 2026 the ISI value blinks for the predetermined period. Afterward, at 2028, the support index indicator 1024 (of controller 1020A) or 1024B (of controller 1020B) stops blinking, and the value changes to the previous Support Index value, and the label "Support Index" reappears on the display 1022. On controller 1020B the head and food support index indicators 1024A and 1024C reappear. After a predetermined period, for example 180 seconds, at 2030 the controllers 1020A, 1020B go to a sleep state.

Referring again to FIG. 19A, if at 2026 the Ideal Support mode is not on, then at 2032 the Ideal Support mode is toggled on, and the control begins tracking the number of defined movements at the current Support Index value. The control uses this information about the number of movements at the current Support Index value to determine a suggested Ideal Support Index value. At 2034, the Ideal Support Indicator is turned on, and at 2036 the control tracks the Movement Counter for the current Support Index value. After a predetermined period, for example 180 seconds, at 2040 the controllers 1020A, 1020B go to a sleep state.

If the user releases the Ideal Support Index button 1052 in less than three seconds, then at 2044 the control determines whether the Ideal Support Index mode is on. If the Ideal Support Index mode is on, then at 2046, the Ideal Support Index indicator on display 1022 blinks, for example three times, to show that the Ideal Support Index mode is on. If the Ideal Support Index mode is not on, then at 2048 the control determines which Support Index value has the fewest defined movements. At 2050 the Support Index indicator on the display 1022 of controls 1020A, 1020B begins blinking, and the Ideal Support Index valve is indicated. The label "Support Index" goes dark, and the Ideal Support Index Indicator blinks in unison with the blinking Ideal Support Index value on the Support Index indicator 1024. In the Control 1020B, the Support Index indicators 1024A and 1024C also go dark.

Referring now to FIG. 19C, if within the predetermined time, for example 10 seconds, the user presses any other button on the controllers 1020A, 1020B, then at 2054 the Support Index indicators on the controls 1020A, 1020B resume their normal operation, with the current Support Index value displayed on indicator 1024, and the "Support Index" label reappearing on the display 1022. If the Ideal Support Index mode is on, the Ideal Support Mode Indicator stops blinking and switches to continuous display, and if Ideal Support Index mode is not on, the Ideal Support Mode indicator stops blinking and switches off. At 2056 the function of the other button begins. If the user does not press another button within the predetermined time, then at 2060 the Support Index indicators on the controllers 1020A, 1020B resume their normal operation, with the current Support Index value displayed on indicator 1024, and the "Support Index" label reappearing on the display 1022. If the Ideal Support Index mode is on, the Ideal Support mode indicator stops blinking and switches to continuous display, and if Ideal Support Index mode is not on, the Ideal Support mode indicator stops blinking and switches off. After a predetermined period, for example 180 seconds, at 2062 the controllers 1020A, 1020B go to a sleep state.

Memory Button

The Memory Button 1054 (similar to memory buttons 116 and 216) saves the current user determined settings, so that pressing the Auto-Fill button 1046 automatically restores the mattress to previously saved user settings.

Light Button

The light button 1056 is similar in operation to the light button 218. A possible control logic for the operation of the light button 1056 is shown in FIG. 16. Upon pressing the light button 1056, at 2102 the display screen 1022 lights up. If the user presses the light control button 1056 for more than a predetermined time, for example three seconds, then at 2106 the control determines whether the Autolight mode is on. If the Autolight mode is on, at 2108, the Autolight mode is turned off, and at 2110 the Autolight Indicator on the display 1022 of the control 1020A or 1020B goes dark. After a predetermined period, for example 180 seconds, at 2114 the controllers 1020A, 1020B go to a sleep state. If the Autolight mode is not on then at 2116, the control turns on the Autolight mode (during which the control automatically turns on the light when a user gets out of the bed). At 2118 the Autolight indicator is turned on, signaling to the user that the Autolight mode is on. After a predetermined period, for example 180 seconds, at 2122 the controllers 1020A, 1020B go to a sleep state.

Figure 16B:
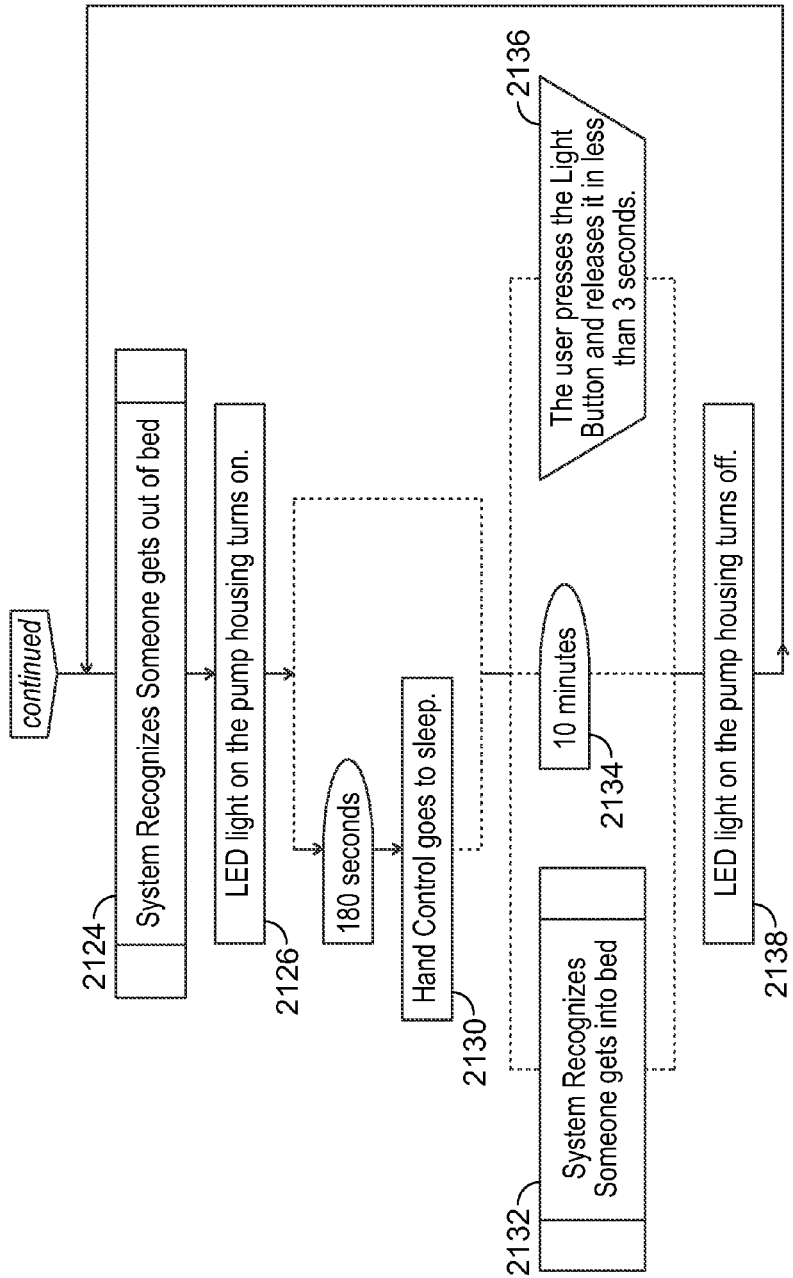

Referring to FIG. 16B, the operation in the Autolight mode is shown. At the 2124, the control identifies when a user gets out of bed, for example using the method described about with respect to FIG. 11, and at 2126 turns on the light 1018 on the pump housing 1004. After a predetermined period, for example 180 seconds, at 2030 the controllers 1020A, 1020B go to a sleep state. Thereafter, at 2132 if the control determines that someone gets into bed, at 2134, after the passage of a predetermined amount of time, for example ten minutes, or at 2136 if the control determines that the user presses the light button 1056 again, and releases it in less than a predetermined time, for example three seconds, then at 2138, the control turns the light 1018 on the pump housing 1004 off.

Referring again to FIG. 16A if the user releases the light button in less than a predetermined time, for example three seconds, that at 2140, the control determines whether the light is on. If the light 1018 is on, then at 2142, the control turns the light 1018 off. After a predetermined period, for example 180 seconds, at 2146 the controls 1020A or 1020B go to a sleep state. If the light 1018 is not on, then at 2148 the control turns the light 1018 on. After a predetermined period, for example 180 seconds, at 2152 the controllers 1020A, 1020B go to a sleep state. Thereafter, at 2150 after the passage of a predetermined amount of time, for example ten minutes, or at 2152 if the control determines that the user presses the light button 1056 again, and releases it in less than a predetermined time, for example three seconds, then at 2154, the control turns the light 1018 on the pump housing 1004 off.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A control for a fluid-filled mattress, the control comprising a display and at least one control button, the control displaying a recommended mode of operation in response to at least one internal pressure measurement of the fluid-filled mattress made while a user is on the fluid filled mattress, wherein at least one internal pressure measurement of the fluid-filled mattress made while the user is on the fluid filled mattress comprises a measure of the increase in the internal pressure from a predetermined level caused by the user lying on the fluid-filled mattress.

2. The control according to claim 1 wherein the control determines a movement measurement threshold based at least in part upon the determined increase in pressure.

3. The control according to claim 2 wherein the control estimates the number of movements based upon a count of the number of times a pressure change exceeds the determined movement measurement threshold.

4. The control according to claim 3 wherein the control recommends a mode of operation based at least in part on the estimated number of movements.

5. The control according to claim 2 wherein the control estimates the rate of movements based upon a count of the number of times a pressure change exceeds the determined movement measurement threshold.

6. The control according to claim 5 wherein the time period over which the rate of movements is estimated begins upon detection of a pressure increase indicating that the user is on the mattress.

7. The control according to claim 6 wherein the time period over which the rate of movements is estimated ends after the lapse of a predetermined period of time.

8. The control according to claim 7 wherein the time period over which the rate of movements is estimated ends upon detection of a pressure decrease indicating that the user is not on the mattress.

9. The control according to claim 8 wherein the control recommends a mode of operation based at least in part on the estimated rate of movements.

10. A control for a fluid-filled mattress, the control comprising a display and at least one control button, the control displaying a recommended mode of operation in response to a measure of movements of a user on the fluid-filled mattress over a predetermined period of time.

11. The control according to claim 10 wherein the recommended mode of operation includes at least a recommended internal pressure level.

12. The control according to claim 10 wherein the control measures movements by counting predetermined changes in internal pressure in the fluid-filled mattress.

13. The control according to claim 12 wherein the control adjusts the value of the predetermined changes in internal pressure, based upon pressure measurements when the user is on the fluid-filled mattress.

14. The control according to claim 10 wherein the control measures movements in a period between the user operating the at least one control button.

* * * * *